United States Patent [19]
Taguchi et al.

[11] Patent Number: 5,937,232
[45] Date of Patent: *Aug. 10, 1999

[54] IMAGE FORMING APPARATUS WITH DISPLAY DEVICE FOR DISPLAYING BEFORE AND AFTER IMAGE PROCESSING DATA

[75] Inventors: Kazushige Taguchi, Warabi; Yutaka Hasegawa; Yoshihiro Sakai, both of Tokyo, all of Japan

[73] Assignee: Ricoh Company, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/578,135

[22] Filed: Dec. 26, 1995

[30] Foreign Application Priority Data

Dec. 26, 1994 [JP] Japan .................................. 6-323272
Dec. 11, 1995 [JP] Japan .................................. 7-322095

[51] Int. Cl.$^6$ ................................................ G03G 15/00
[52] U.S. Cl. .......................................... 399/81; 399/182
[58] Field of Search ................ 399/81, 158, 182–185; 358/448, 452, 453, 462, 300

[56] References Cited

U.S. PATENT DOCUMENTS

| | | |
|---|---|---|
| 4,627,707 | 12/1986 | Tani et al. . |
| 4,740,814 | 4/1988 | Folkins . |
| 4,837,635 | 6/1989 | Santos . |
| 4,984,020 | 1/1991 | Adachi et al. . |
| 5,041,866 | 8/1991 | Imoto . |
| 5,129,048 | 7/1992 | Ng ....................................... 358/462 X |
| 5,406,389 | 4/1995 | Hasegawa et al. ....................... 358/452 |
| 5,444,550 | 8/1995 | Enokida et al. ......................... 358/453 |
| 5,553,277 | 9/1996 | Hirano et al. ........................ 358/462 X |

FOREIGN PATENT DOCUMENTS

| | | |
|---|---|---|
| 2-109091 | 4/1990 | Japan . |
| 2-288467 | 11/1990 | Japan . |
| 3-172076 | 7/1991 | Japan . |
| 3-278793 | 12/1991 | Japan . |
| 3-282876 | 12/1991 | Japan . |
| 4-045658 | 2/1992 | Japan . |
| 5-68161 | 3/1993 | Japan . |
| 3-92075 | 4/1994 | Japan . |
| 6-150057 | 5/1994 | Japan . |
| 6-268857 | 9/1994 | Japan . |

*Primary Examiner*—Robert Beatty
*Attorney, Agent, or Firm*—McDermott, Will & Emery

[57] ABSTRACT

The image forming apparatus according to the present invention comprises an operating unit for displaying a mode setting screen for obtaining a desired image and inputting a processing mode by means of selecting one of the keys, a system control unit for executing a control processing according to the processing mode inputted from the operating unit, an image processing unit for executing a specified image processing to the image data according to a control signal from the system control unit, and an image display unit for switchably displaying image data prior to and after processing outputted from the image processing unit.

24 Claims, 27 Drawing Sheets

FIRST SCAN
(BEFORE PROCESSING)

FIRST SCAN
(BEFORE PROCESSING)

SECOND SCAN
(AFTER PROCESSING)

FIRST SCAN
(BEFORE PROCESSING)

FIRST SCAN
(BEFORE PROCESSING)

SECOND SCAN
(AFTER PROCESSING
FOR COLOR CONVERSION)

FIRST SCAN
(BEFORE PROCESSING)

FIRST SCAN
(BEFORE PROCESSING)

SECOND SCAN
(AFTER PROCESSING
FOR INCLINATION)

FIRST SCAN
(BEFORE PROCESSING)

F I G. 3 0
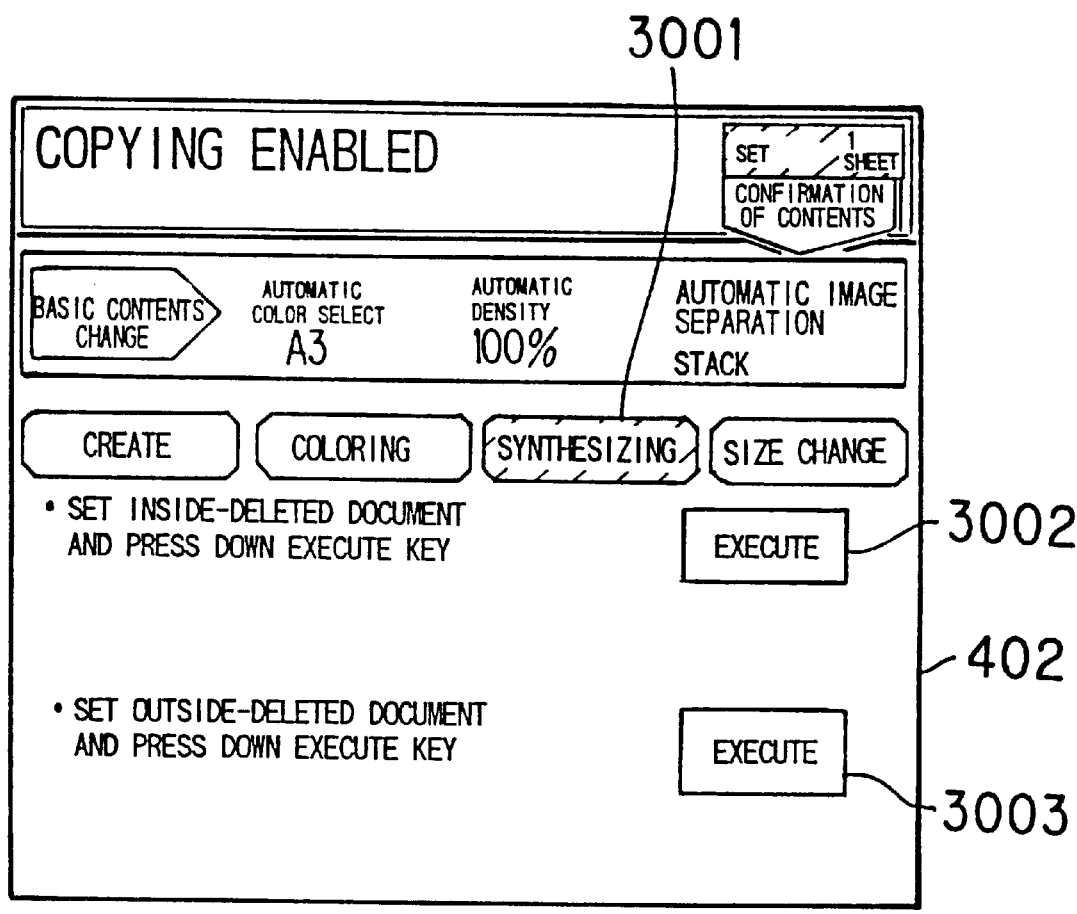

IMAGE FORMING APPARATUS WITH DISPLAY DEVICE FOR DISPLAYING BEFORE AND AFTER IMAGE PROCESSING DATA

FIELD OF THE INVENTION

The present invention relates to an image forming apparatus such as a digital copying machine, which can display image data for a read document and also image data subjected to image processing on a monitor, and in which a user can confirm a result of processing corresponding to each image processing mode checking the display screen, and sets conditions for an image finally required.

BACKGROUND OF THE INVENTION

In recent years, a digital copying machine has various functions for processing a document image, such as black-and-white inversion, mirroring, inside-blanking, or image separation. Furthermore a color digital copying machine has, in addition to the functions described above, color processing functions such as color conversion or color deletion. A user selects a desired image area or any one of the functions described above for a particular image from an operating section or with an editor to set conditions for image processing. In this case, generally, a user outputs a trial copy to check whether a desired image quality can be obtained or not, executes fine adjustment in a case where a desired image quality has not been obtained, and again outputs a trial copy for checking finishing of the outputted copy.

Also there has been known an apparatus in which functions for γ-correction (density conversion) for subjecting various types of document image including a diagram comprising lines such as a character image, an image in which gray levels indicates information such as a color map to density correction with a processing suited to each type of image are provided and a user can select any of the functions.

Also in the conventional type of copying machine, separation of a character section, a screen tone section, and a photograph section which coexists in a document image has been executed, for instance, by screen tone separation by means of edge detection and pattern matching according to a degree of contrast in each area of the image, and furthermore a high image quality has been realized by way of automatically executing an optimal gray level processing or a filtering such as a character mode or a photograph mode.

Also in order to eliminate the necessity for the trial copying works as described above, as an image forming apparatus in which a user executes image processing for a read image as an object for recording checking displays provided on the monitor and records the image after having been subjected to the image processing, the "image processing system" disclosed in Japanese Patent Laid-Open Publication No. 288467/1990 has been known.

Also as one of the related referential technological documents, a "digital copying machine" is disclosed in Japanese Patent Laid-Open Publication No. 68161/1993. This digital copying machine has functions for taking out a required portion from a displayed image, allocating it at a necessary point, and synthesizing a plurality of images, and outputs a new image.

In the conventional type of copying machine as described above, however, in a case where a desired image is obtained by using each image editorial function, as images in two state, namely am image prior to processing and that after processing can not be outputted on a screen simultaneously, so that it has been disadvantageously impossible to efficiently and accurately confirm how a result of image processing is.

The problems relating to the conventional technology can be summarized as follows.

Firstly, when a user selects parameters for image processing, a relation between an image prior to processing and that after processing can not directly be confirmed in its adjustment, so that operations for fine adjustment are difficult.

Secondly, in a case where parameter setting is executed in the form of fine adjustment, a required image quality is extremely high, so that there is no way but to confirm a result of adjustment by outputting a trial copy, which makes the workability lower with the operating cost increased.

Thirdly, as the γ-characteristics of a read image or those of an output image can not be determined previously, density adjustment for an output image in response to the document image can not accurately be executed.

Fourthly, in operations for recognizing each area when separating specific areas of an image and for setting conditions for the processing, a portion of the processing for image separation can not be executed in good conditions due to a state of a document image, and optimal conditions can not be set, which makes lower not only the image quality but also efficiency in operations for setting conditions for the processing.

SUMMERY OF THE INVENTION

It is a first object of the present invention to enable adjustment of parameters for image processing and realize fine adjustments to image processing, when a user selects parameters for image processing, directly checking image data prior to processing and those after processing.

It is a second object of the present invention to eliminate necessity for a trial copy for checking after a user selected parameters for image processing and also to improve the cost efficiency as well as the workability.

It is a third object of the present invention to make a user accurately grasp the γ-characteristics of a read image and also accurately execute adjustment corresponding to the γ-characteristics.

It is a fourth object of the present invention to make a user accurately grasp the γ-characteristics of an output image and also accurately execute adjustment corresponding to the γ-characteristics.

It is a fifth object of the present invention to make it possible for a user to recognize each areas of an image when separating it and to accurately set conditions for the processing.

It is a sixth object of the present invention to accurately grasp a result of fine adjustment of parameters for image processing without forming an image on recording paper by displaying image data prior to and after processing for each image processing function on an image display section.

It is a seventh object of the present invention to reduce a time required for image processing by displaying image data prior to and after image processing with one scan for reading an image on the image display section.

It is an eighth object of the present invention to make it possible for a user to confirm a result of image synthesization, when a synthesized image for a same document is printed out, by displaying the images in a superimposed state on the image display section by scanning the image at least once prior to forming the image.

In an image forming apparatus according to the present invention, a system controlling means executes control processing according to parameters for processing or a set mode each inputted from an operating means, an image processing means subjects the image data to a specified image processing according to a control signal from the system controlling means, and then switchably displays the image data after the processing and image data prior to processing on a monitor in an image display means, so that a user can directly confirm images prior to processing and after the processing when selecting parameters for image processing, and furthermore can operate adjustment to the image quality checking the display screen.

An image forming apparatus according to the present invention has a plurality of image processing blocks for each processing, and displays image data prior to processing and after the processing from before and behind the image processing block thereon. In a case of images having an image quality higher than a certain level, users want to get images suited to their desire and to content of each image, and there increases such a tendency that images in accordance therewith should be achieved for each case, so that a mode for displaying states prior to and after processing is added to each function for image processing so that a user can make adjustment to an image quality as fine as possible.

In an image forming apparatus according to the present invention, the image display means has functions for processing/editing image data on a display screen thereon, sends an instruction for the processing to the image processing means via the system controlling means, and image processing is executed according to the specified image processing to form the image.

In an image forming apparatus according to the present invention, the image processing means displays image data prior to processing (read data for documents) and those after the processing on a same screen of a monitor in the image display means, so that a user can directly confirm images prior to processing and after the processing when selecting parameters for image processing, and further can execute adjustment to the image quality checking the display screen.

In an image forming apparatus according to the present invention, the image processing means displays scanner γ-characteristics prior to correction and after the correction for each of R, G, and B of read image data on the image display means, and at the same time displays a select key for selecting parameters for γ-correction for each of R, G, and B data to the read image data, and executes processing of density correction for image data according to the γ-characteristics corresponding to the select key.

In an image forming apparatus according to the present invention, the image processing means displays printer γ-characteristics prior to correction and after the correction for Y, M, C, and Bk on the image display means, and at the same time displays the select key for selecting parameters for γ-correction for each of R, G, and B data corresponding to the image data to be finally outputted, and executes processing of density correction for image data according to the γ-characteristics corresponding to the select key.

In an image forming apparatus according to the present invention, the image processing means displays the select key for selecting each of processing or editorial works such as inclination, shading, mirroring, inside-blanking, and coloring on the image display means, and executes processing or editorial works for image data according to depression of the select key.

In an image forming apparatus according to the present invention, the image processing means separates a character section, a halftone section, and a photograph section from each other for each area on the image display means, which makes it possible to confirm a result of the separation thereof at once, further displays the select key for setting and deleting parameters for each discrete area, and executes image processing for the discrete image according to depression of the select key.

In an image forming apparatus according to the present invention, a user presses down the select key checking the discrete image outputted and displayed on the image display means, and executes any type of modification to the indicated area with the select key in the image processing means.

In an image forming apparatus according to the present invention, a user can easily grasp and to change parameters for fine image processing without outputting the copy by displaying in a row image data prior to and after processing of each function for image processing on the image display means.

In an image forming apparatus according to the present invention, images prior to and after processing are displayed simultaneously on the image display section by one scan if image data is prior to processing or after the processing in the processing block for the RGB system.

In an image forming apparatus according to the present invention, in a case where an image synthesized from different documents is printed out, the image can easily be checked to confirm how they are superimposed by displaying the images obtained by scanning each document and displaying the images in a state where the images are superimposed on each other respectively on the image display means prior to formation of an image.

In an image forming apparatus according to the present invention, scans each document prior to formation of an image, displays the images in a state where the images are superimposed on each other, when outputting an image synthesized from different documents, so that a use can check how the images are superimposed.

In an image forming apparatus according to the present invention, a user presses down a scanner γ-correction key when density correction for read image data is to be executed, or presses down a printer γ-correction key when density correction for output image data is to be executed, or presses down an automatic image separating key in a case where a character section, a photograph section, and a screen tone section for the read image data are to be automatically and discretely processed, or presses down a processing/editing key when processing and editorial works such as creative edition or coloring is to be executed.

The system controlling means executes a control processing when each of the operating keys is pressed down, and gives a control signal for the operation to the image processing means, which executes a specified image processing corresponding to the key input to the image data according to the control signal, and switches image data prior to processing to image data after the processing, or displays image data simultaneously on the image display means, so that a user can directly confirm thereon images prior to processing and after the processing when selecting parameters for image processing, and further operates adjustment to the image quality checking the display screen.

In an image forming apparatus according to the present invention, a user selects any of the keys prepared for the operating means such as a processing/editing key, or a create/edit key for executing a processing such as inclination, mirroring, shadowing, and inside-blanking, or a color processing key for executing a processing such as color conversion, deletion of a specified color, and under color, whereby a user can make fine adjustments to the image quality checking the image displayed on the image display means according to the specified processing corresponding to the select key.

Other objects and features of this invention will become understood from the following description with reference to the accompanying drawings.

BRIEF DESCRIPTION OF THE DRAWINGS

FIG. 30 is an explanatory view showing an example of a setting screen in a processing/editing mode;

DESCRIPTION OF THE PREFERRED EMBODIMENTS

Figure 1:
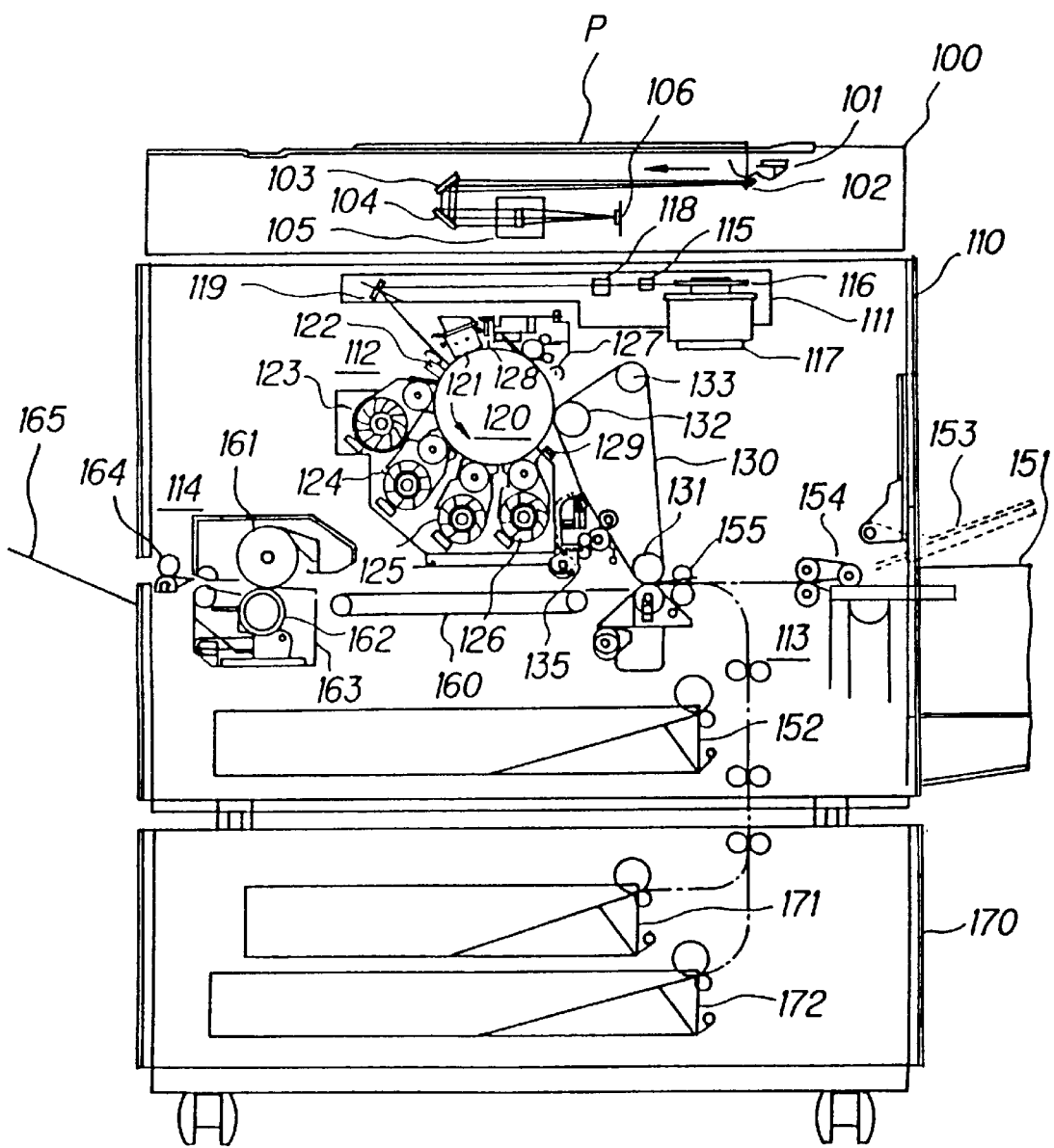
FIG. 1 is an explanatory view showing configuration of a digital full-color copying machine in which the present invention is advantageously applied thereto.

Next, a detailed description is made for an embodiment of the present invention with reference to related drawings. Description of this embodiment assumes a digital full-color copying machine having various types of image processing functions. FIG. 1 is an explanatory view showing configuration of a digital full-color copying machine suited to application of the present invention. This digital full-color copying machine comprises a color image reading device 100 (called color scanner hereinafter) as a document reading means and a color image recording device 110 (called color printer hereinafter), and furthermore in this case has a paper feeder 170 for allowing increase of a quantity of feed paper.

A color scanner 100 comprises a halogen lamp 101 for illuminating a document P, a first mirror 102 for guiding light reflected from the document P, a second mirror 103, a third mirror 104, a focusing lens 105, and has a color sensor function for converting light focused by said focusing lens 105 to an image signal; namely a 3-line CCD (charge-coupled device) 106 which can simultaneously read 3 types of data for blue (B), green (G), and red (R).

The color printer 110 largely comprises an optical writing unit 111 as image writing means, an image forming section 112, a paper feed section 113, and a fixing/paper discharging section 114 or the like. The optical writing unit 111 is a box type unit comprising a laser diode 115 using a semiconductor laser therein, a laser drive control plate (not shown herein), a polygon mirror 116, a polygon motor 117 for rotating a polygon mirror 116, and f/θ lens 118, and a reflection mirror 119.

Provided in the image forming section 112 are the following functional sections centering on a photoconductor drum 120 for forming electrostatic a latent image thereon. In this figure, designated at the reference number 121 is an electrifying charger for homogeneously electrifying the photoconductor drum 120, at 122 a potential sensor for detecting a surface potential on the photoconductor drum 120, at 123 a Bk developing machine for black toner, at 124 a C developing machine for cyan toner, at 125 an M developing machine for Magenta toner, at 126 a Y developing machine for yellow toner, and at 127 a light sensing cleaning unit for removing or recovering residual toner or the like on the photoconductor drum 120, and a unit for removing electric charge prior to cleaning is provided therein. Also the reference numeral 128 indicates a charge-removing lamp to remove residual potential on the photoconductor drum 120, while the reference numeral 129 indicates a development density pattern detecting unit.

Also in this figure, a component 130 is an intermediate transfer belt unit spanned over a driving roller 131, a belt transfer bias roller 132, and a slave roller 133, and can be driven by a belt driving motor 134. Provided on this intermediate transfer belt unit 130 is a belt cleaning unit 135, and the belt cleaning unit 135 comprises a brush roller 136, a rubber blade 137 and a connecting/disconnecting mechanism 138 to and from the intermediate transfer belt unit 130.

Each of the developing machines 123 to 126 comprises a Bk developing sleeve 139 rotating with an ear for developing powder for developing an electrostatic latent image on the photoconductor drum 120 contacted to a surface of the photoconductor drum 120, a C developing sleeve 140, an M developing sleeve 141, a Y developing sleeve 142, developing paddles 143 to 146 for pumping up and agitating developing powder, and toner density detecting sensors 147 to 150 each detecting density of developing powder.

The paper feed section 113 comprises a paper feed cassette 151, a paper feed cassette 152, and a manual paper feed tray 153 for having specific types of paper such as film for OHP fed sheet by sheet. Also the reference numeral 154 indicates a paper feed roller for feeding recording paper in the paper feed cassette 151, while the reference numeral 155 indicates a resist roller for transferring recording paper in synchronism to an image on the intermediate transfer belt unit 130. The reference numeral 156 indicates a paper transfer unit, and the paper transfer unit 156 comprises a paper transfer bias roller 157, a roller cleaning blade 158, and a connecting/disconnecting mechanism 159 to and from the belt. Also the reference numeral 160 indicates a carrier belt for carrying transferred recording paper.

The fixing/paper discharging section 114 comprises a fixing unit 163 having a fixing roller 161 with a fixing heater incorporated therein and a pressurizing roller 162 energized against the fixing roller 161 with a specified level of pressure, a paper discharging roller 164, and a paper discharging tray 165. The paper feeder 170 comprises paper feed cassettes 171, 172.

Next, a description is made for operations in the configuration as described above. The color scanner 100 receives a scanner start signal synchronized to an operation of the color printer 110, scans a document in the direction as indicated by the leftward arrow mark, and obtains image data for one color once for each scan. An image of the document P is illuminated by the halogen lamp 101, the reflected light is focused through the first mirror 102, second mirror 103, third mirror 104 by the focusing lens 105 onto the 3-line CCD 106. This operation is executed repeatedly 4 times to successively obtain image data for 4 colors. Then color image data for the document P is read by each of blue (B), green (G), and red (R), and is converted to an electric image signal. Then the image processing unit 230 (Refer to FIG. 9) executes various types of processing for correction, and color image data for Black (called Bk hereinafter), Cyan (called C hereinafter), Magenta (called M), and Yellow (called Y hereinafter are obtained).

This color data image is visualized by the color printer 110 to Bk, C, M, and Y respectively to form a final color copy. Detailed description is made hereinafter. The optical writing unit 111 converts color image data from the color scanner 100 to an optical signal, optically writes the color image data corresponding to a document image, and forms an electrostatic latent image on the photoconductor drum 120.

In the stand-by state, all of the developing machines 123 to 126 are in the state where all of the developing sleeves 139 to 142 has been disabled, but following description assumes that the developing operations are executed in the order of Bk, C, M, and Y (in the order of forming color images). It should be noted that the order of development is not always limited to this order.

When a copying operation is started, reading of Bk image data is started at a specified timing by the color scanner 100, and an operation for optically writing an image for forming a latent image is started with a laser beam according to the image data. The electrostatic latent image formed according to the Bk image data is called Bk latent image. It should be noted that the same rule is applied also to C, M, and Y.

To enable development of this Bk latent image from the tip section, the Bk developing sleeve 139 is rotated for enabling a brush thereof for development before the tip section of the latent image reaches a position for development in the Bk developing machine, and the Bk latent image is developed with Bk toner. Then the operation for developing the Bk latent image area is continued, but at a point of time when a rear edge section of the latent image passes the position for Bk development, the brush of the Bk developing sleeve 139 is quickly disabled so that the operation for development is not continued. This operation is completed at latest before a front tip of a C latent image according to subsequent C image data reaches there. It should be noted that the operation for disabling the brush is executed by switching a rotational direction of the Bk developing sleeve 139 to a direction contrary to that during development.

The Bk toner image formed on the photoconductor drum 120 is transferred onto a surface of the intermediate transfer belt unit 130 driven at a speed equal to that of the photoconductor drum 120. The toner image transfer is executed, while the photoconductor drum 120 and intermediate transfer belt 130 are contacting to each other, by loading a specified level of bias voltage to the transfer bias roller 132. It should be noted that the Bk, C, M, and Y toner images successively formed on the photoconductor drum 120 are also successively positioned on the intermediate transfer belt unit 130 to form a belt transfer image in which 4 color images are superimposed, and then the image is transferred in batch onto recording paper.

Although the processing in the side of the photoconductor drum 120 advances from the process for processing Bk image data to the process for processing C color image data, reading of C image data with the color scanner 100 is started at a specified point of time, and the image data is written with a laser beam to form a C latent image. The C developing machine 124 starts rotation of the C developing sleeve 140 after a rear edge of the previous Bk latent image passes the position for development, but before a front edge of the C latent image reaches the position for development to supply developing toner to the ear thereof, and forms a C latent image with C toner. Then development of the C latent image area is continued, and when a rear edge section of the latent image passes the position for development, an ear of the C developing sleeve 140 is disabled like in a case of the Bk developing machine 123. Also this operation is completed before a front edge section of a subsequent M latent image reaches the position for development. In the processes for processing the M and Y image data, operations for reading each image data, forming a latent image, and developing the image are executed like in the processes for processing the Bk and C image data, so that description concerning the operations is omitted herein.

The intermediate belt unit 130 is driven and rotated by the belt driving motor 134. The bias roller 157 on the paper transfer unit 156 is ordinarily kept separated from a surface of the intermediate transfer belt unit 130, but at a point of time when an image, in which 4 color images are superimposed, transferred onto and formed on the surface of the intermediate transfer belt unit 130 is transferred in batch onto recording image, the bias roller 157 is pressed by the connecting/disconnecting mechanism 159 so that a specified level of bias voltage is loaded to the bias roller 157 and the image is transferred onto recording paper. Also the recording paper is fed, for instance, from a paper feed cassette 151 with a paper feed roller 154, and is fed with a resist roller 155 at a point of time when the tip section of the superimposed 4-color-image on the surface of the intermediate transfer belt unit 130 reaches a position where the image is transferred to paper.

Now recording paper to which a superimposed 4-color-toner image has been transferred in batch from the surface of intermediate transfer belt 130 is transferred into a fixing unit 136 through a carrier belt 160. In the fixing unit 136, the toner image on the recording paper is fixed by being melted with a fixing roller 161 kept under a specified temperature and with a pressurizing roller 162 energized with a specified pressure. Then the recording paper is discharged to a paper discharging tray 165 with the paper discharging roller 164, whereby a final full-color copy can be obtained.

On the other hand, the surface of the photoconductor drum 120 after belt transfer is cleaned with the light sensing cleaning unit 127, and further residual electrical charge is removed with the charge-removing lamp 128 to prepare for the following copying. Also the surface of the intermediate transfer belt 130 after the toner image is transferred to recording paper is cleaned by pressing down again the belt cleaning unit 135 thereto with the connecting/disconnecting mechanism 138.

When a copying operation is repeatedly executed, operations of the color scanner 100 and the process for forming an image onto the photoconductor drum 120 are again executed to a second sheet of Bk image (a first color) following a process for a first sheet of Y image (a fourth color) at a specified point of time. Also the intermediate transfer belt unit 130 goes to a process for transferring in batch a first sheet of a 4-color-superimposed image to recording paper, and after the process, a second sheet of Bk toner image is transferred through the intermediate transfer belt to an area where the surface thereof has been cleaned with the belt cleaning unit 135. The same operation as that for a first sheet is executed after that.

It should be noted that, although description above was made for a copy mode to obtain 4-color full-color as an example, in a case of a 3-color copy mode or a 2-color copy mode, the same operations as those described above are executed for specified numbers color by specified times. Also in a case of a monochrome copy mode, only a unit of developing machine for the object color is kept in the enabled state (where development powder is supplied) until a specified number of copies are obtained. The intermediate transfer belt unit 130 drives at a specified speed in the reciprocal directions in a state of being contacted with the surface of photoconductor drum 120. Then the belt cleaning unit 135 executes operations for monochrome copying in a state of being contacted with the intermediate transfer belt unit 130.

Figure 2:
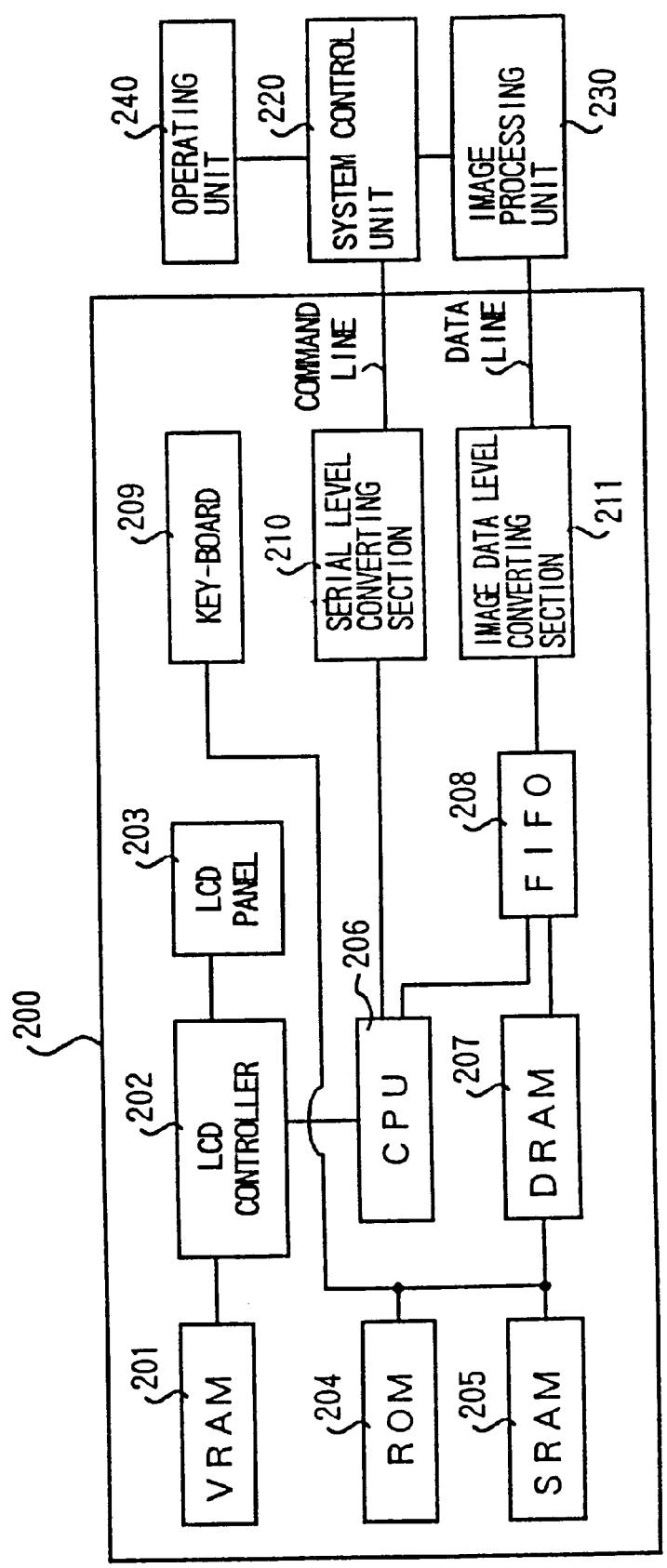
FIG. 2 is a block diagram showing configuration of an image display unit according to the present embodiment.

Next, a description is made for the image display function provided in the digital color copying machine described above. FIG. 2 is a block diagram showing configuration of an image display unit according to the present embodiment. In the figure, the reference numeral 200 indicates an image display unit as an image display means, which mainly comprises the following each components. Namely, designated therein at the reference numeral 201 is a VRAM as video memory, at 202 a LCD controller for driving control of a LCD panel, at 203 a LCD (liquid crystal) panel for using as a display screen, at 204 a ROM, at 205 a SRAM, and at 206 a CPU incorporating therein a DMA controller.

And in the figure, designated at 207 is a DRAM for storing image data, at 208 FIFO as a line buffer, at 209 a key-board, at 210 a serial level converting section, and at 211 an image data level converting section as a driver/receiver. Also, designated at 220 is a system control unit as a system controlling means, at 230 an image processing unit as an image processing unit, at 240 an operating unit corresponding to an operating means. Detailed description is made for the system control unit 220, image processing unit 230, and operating unit 240 later.

Figure 3:
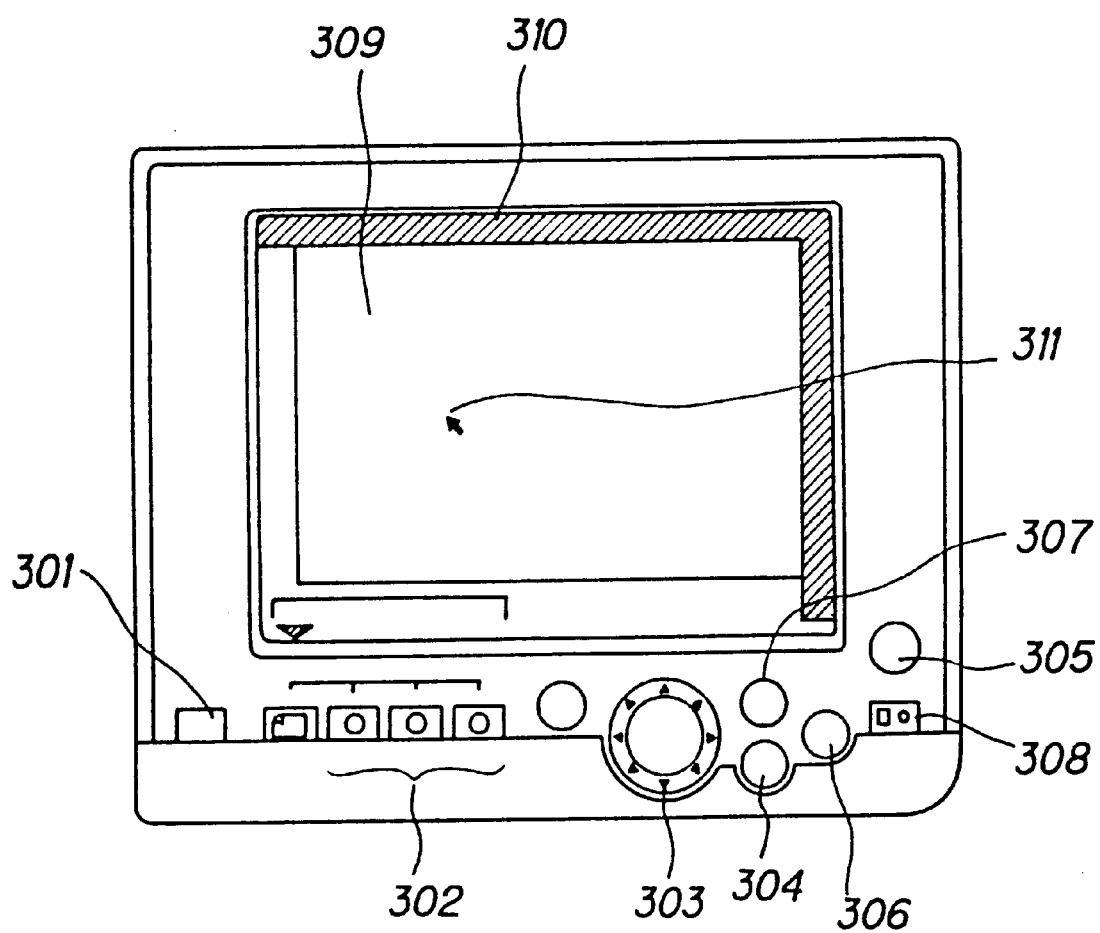
FIG. 3 is an explanatory view showing panel configuration of an image display unit according to the present embodiment.

FIG. 3 is an explanatory view showing panel configuration of the image display unit according to the present embodiment, and in the figure, designated at the reference numeral 301 is a start key for starting an operation for reading a document, at 302 a screen magnification specifying key for specifying magnification of display, at 303 a cursor key for moving a cursor, at 304 a dot specifying key for specifying a dot indicated by the cursor, at 305 a plane switching key for switching a discrete display for each of R, G, and B data to a simultaneous display for RGB and vice versa, at 306 a close key for connecting a start point to an end point when an area (right exterior angle, polygon) is specified, at 307 a clear key for deleting a finally inputted dot, and at 308 an all clear key for deleting all of specified dots. Also the reference numeral 309 indicates a concrete example of the LCD panel 203, namely a display having an editor function used when a read image is displayed or an area and color for a document is specified, at 310 a scale display for showing estimated dimension for a document, and at 311 a cursor for showing a indicated position on a display 309.

Next, a description is made for basic operations of an image display unit 200 constructed as shown in FIG. 2 and FIG. 3 above. At first, each copying condition such as a copy mode set by a user is inputted by pressing down each of the keys (Refer to FIG. 4) provided in the operating unit 240. Condition for an operating mode such as a copy mode set herein are sent to the system control unit 220. The system control unit 220 executes control processing for executing the set copy mode. In this step, a control signal is sent from the system control unit 220 to each of functional units such as a color scanner 100, an image processing unit 230, an optical writing unit 111, and an image display unit 200.

Further description is made for operations of the image display unit 200. To display an image read from the color scanner 100 on the image display unit 200, the color scanner 100 starts reading a document image according to the control signal from the system control unit 220, and the image processing unit 230 executes image processing suited for display on the image display unit 200 according to the image signal from the color scanner 100, then outputs image data for the document to the image display unit 200.

The image data outputted from the image processing unit 230 is stored in the DRAM 207 for storing image data with the DMA controller incorporated in the CPU 206 through the image data level converting section 211 and FIFO 208 in the image display unit 200. Also a control signal for the image data is sent to the image display unit 200 together with the image data and only an effective image area can be fetched therein.

Image data stored in the DRAM 207 is displayed on the LCD panel 203 (Display 309) through the LCD controller 202 by being transferred to the VRAM 201. It should be noted that transmission of the data from the DRAM 207 to the VRAM 201 is also executed by the DMA controller in the CPU 206, and a display of image with a changed size such as enlarging, reducing, and thinning out, or a display of a portion of the image data becomes possible by transferring any portion thereof. Also image data transferred to the VRAM 201 is displayed on the LCD panel 203 (Display 309) under a control by the LCD controller 202.

The image display unit 200 may display an image on the LCD panel 203, and may be used as a display editor for executing an area specification/mode setting for editorial works or processing on the screen thereof.

Figure 4:
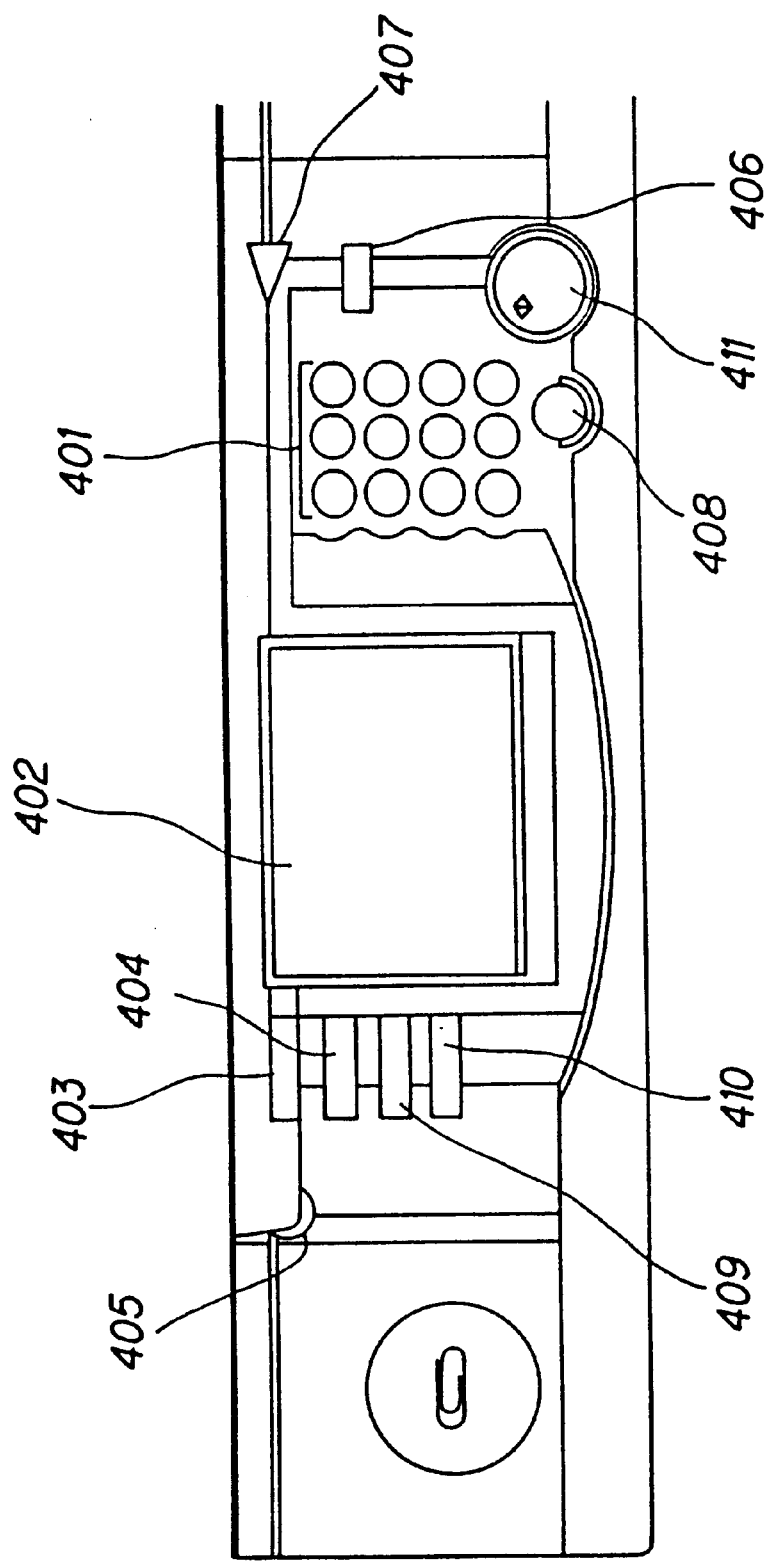
FIG. 4 is an explanatory view showing configuration of key arrangement in an operating unit according to the present embodiment.

FIG. 4 is an explanatory view showing configuration of key arrangement of the operating unit 240 according to the present embodiment. In the figure, designated at the reference numeral 401 is a ten-key for inputting a numeral value such as a number of sheets of copy, at 402 a touch panel key provided in the touch panel on which an operating state or messages are displayed, at 403 a program key for registering setting for well used modes or calling them up, at 404 an image adjusting key used when adjustment to an image quality is made, at 405 a brightness adjusting volume for adjusting to the brightness on the display screen, at 406 a mode clear/remaining heat key for deleting the set contents or keeping a remaining heat for a certain period of time, for instance, one second or more by pressing down the key, at 407 an interrupt key used when other document is copied by interrupting copying, at 408 a clear/stop key used in a case where the inputted numerical value is to be cleared or in a case where copying is to be interrupted during a copying operation, at 409 an area processing key used in a case where a mode such as an area processing or editorial works mode is used on the image display unit 200 (Display editor), at 410 an image processing state confirming mode key used when an image processing confirming mode setting screen is to be displayed, and at 411 a print start key for starting copying.

The touch panel key 402 sets a key area in the same range as that on which a key range for each type of keys displayed on the LCD panel of the operating unit 240 is displayed, and executes processing for the set key when the touch panel key 402 detects depression within the set range. It should be noted that description is made later for a detecting circuit of the touch panel key 402.

Figure 5:
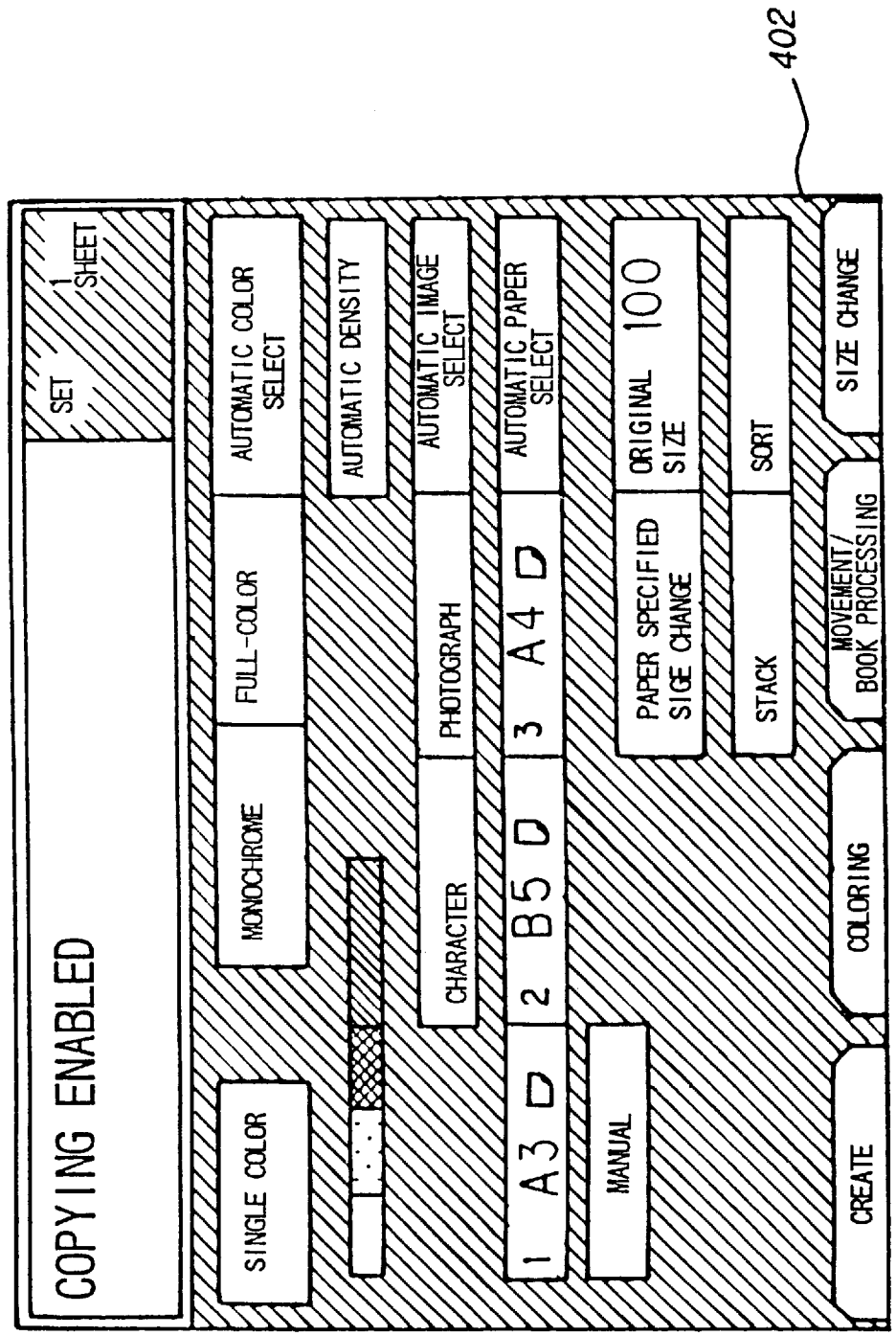
FIG. 5 is an explanatory view showing an example of a crystal liquid display screen according to the present embodiment.

FIG. 5 is an explanatory view showing an example of an LCD (Liquid crystal) display screen according to the present embodiment. As shown in FIG. 5, on the LCD screen there is a mode select display such as a color mode, an automatic density, a manual density, an image quality mode, an automatic paper select, a paper feed tray, a paper automatic size change, a change for an original size, sort, and stack, and further prepared also thereon is a sub-screen select display such as creative edition, coloring, movement/book processing, and image size change. Also each of keys having the same size as that on each of the display is set on the touch panel.

Figure 6:
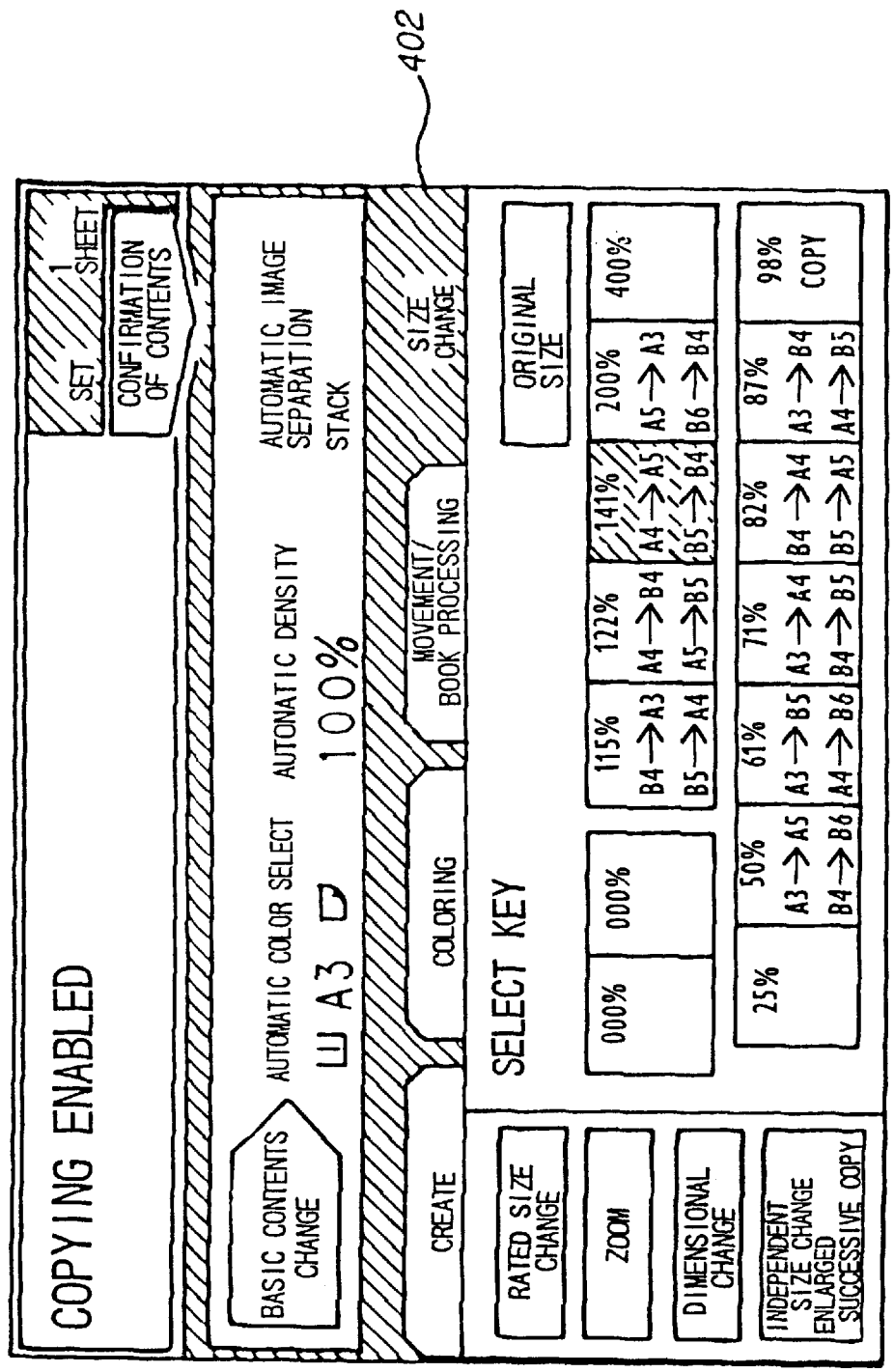
FIG. 6 is an explanatory view showing an example of a display screen by pressing down an image size changing key in FIG. 5.

FIG. 6 is an explanatory view showing an example of a display screen by depression of the image size change key in FIG. 5. If the image size change key of touch panel key 402 is pressed down, the image size change setting screen is scrolled up from the lower side of the screen. A key for rated image size change (image size change mode in which an image size change rate is preset) is set on the image size change screen. For instance, when a touch panel key indicating 71% is depressed, an image size change rate of 71% is selected. In addition, set on the left side of the screen are a zoom key, a dimensional change key, and an independent image size change key/enlarged successive copy key for selecting any of image size change keys other than a rated image size change mode.

Figure 7:
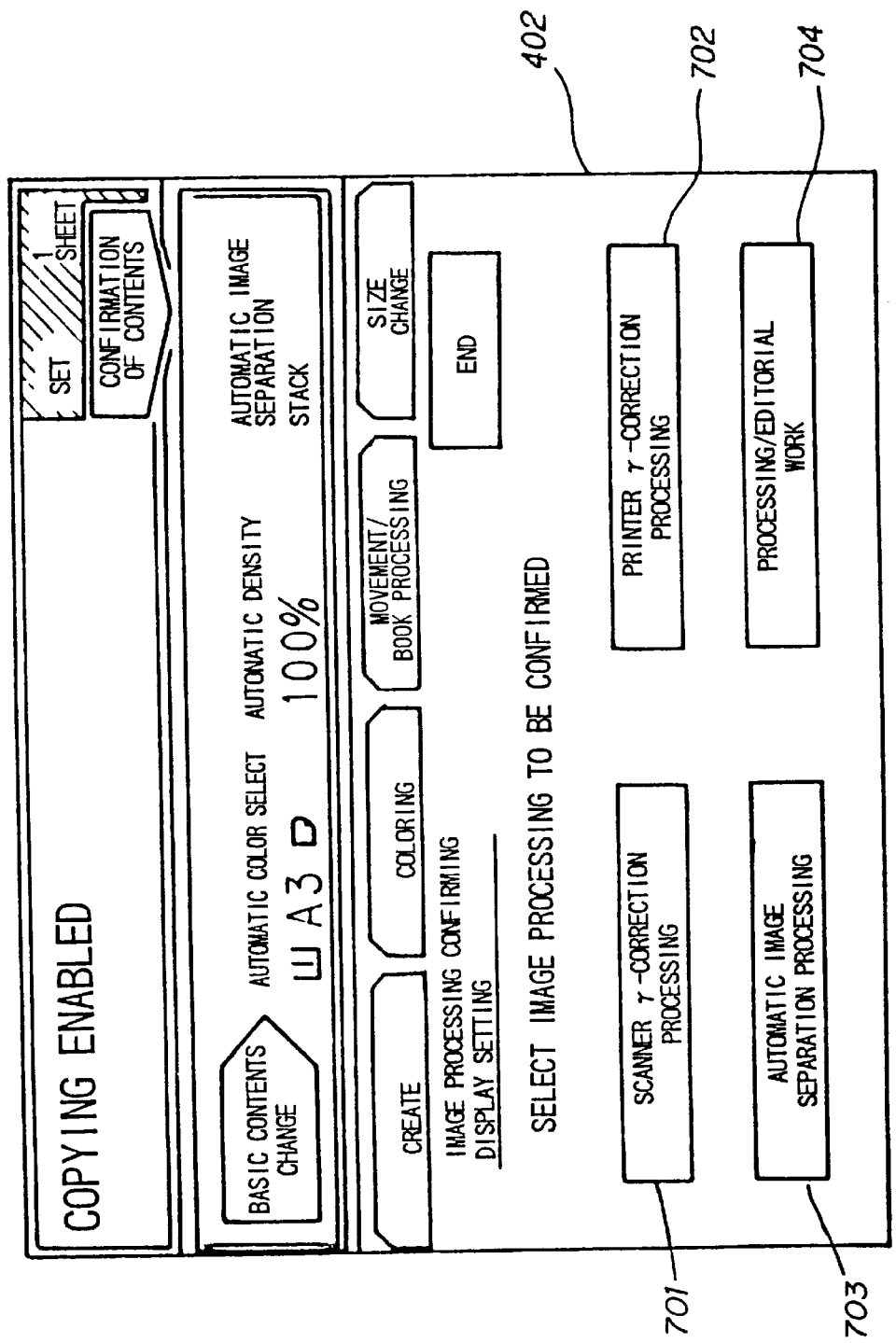
FIG. 7 is an explanatory view showing an example of a set screen in a check mode for a state of image processing.

FIG. 7 is an explanatory view showing an example of setting screen in an image processing state confirming mode. In the embodiment, the image processing state confirming mode is executed so that a user can call up and confirm a result of the image processing on the display 309 in the image display unit 200.

In FIG. 7, to select any of image processing a user wants to confirm, each of the image processing select keys is displayed thereon and a mode is set by pressing down any of the keys. A scanner γ-correction processing key 701, a printer γ-correction processing key 702, an automatic image separation processing key 703, and a processing or editorial work key 704 are prepared as the keys for mode selection. By pressing down any of these select keys, a confirming screen for each processing is displayed, and parameters prior to and after correction can be confirmed, set, and be displayed thereon. Detailed description is made hereinafter for each setting with each of the select keys described above.

Figure 8:
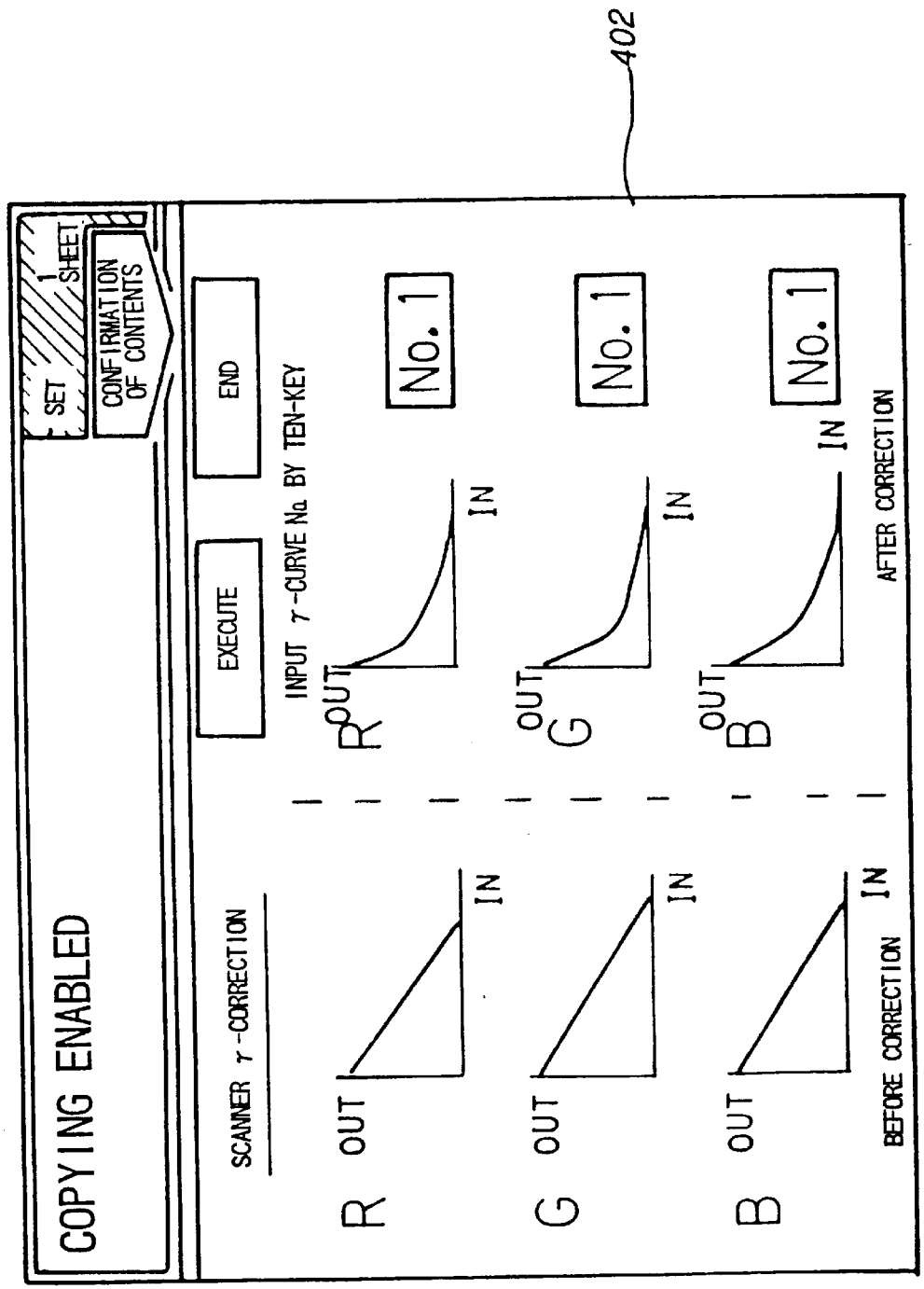
FIG. 8 is an explanatory view showing an example of scanner γ-correction confirming screen with a scanner γ-correction processing key.

FIG. 8 is an explanatory view showing the scanner γ-correction confirming screen selected when the scanner γ-correction processing key 701 is pressed down. When the scanner γ-correction processing key 701 shown in FIG. 7 is pressed down herein, the scanner γ-correction confirming screen shown in FIG. 8 is displayed. Namely, on the scanner γ-correction confirming screen, γ-curves (density conversion curve) of R, G, and B prior to and after correction is displayed. Also by referring to the γ-curves after the correction, a γ-curve can be selected in accordance with a type of document or the user's desire.

Selection of the γ-curve as described above is fixed by pressing down a γ-curve select key, executing white/black inversion, and then by inputting a γ-curve number with the ten-key, and depressing a # key. The execution of the scanner γ-correction confirming display is started by pressing down the "Enter key".

When the scanner γ-correction has been started by depressing the "Execute" key, the operating unit 240 transfers set data for an image processing state confirming mode display and a γ-curve to the system control unit 220. Then the system control unit 220 transfers parameters for each setting to the image processing unit 230 and image display unit 200. Also the system control unit 220 enables operation of the color scanner 100. Whereby image read is started, and image data is inputted to the image processing unit 230.

Figure 9:
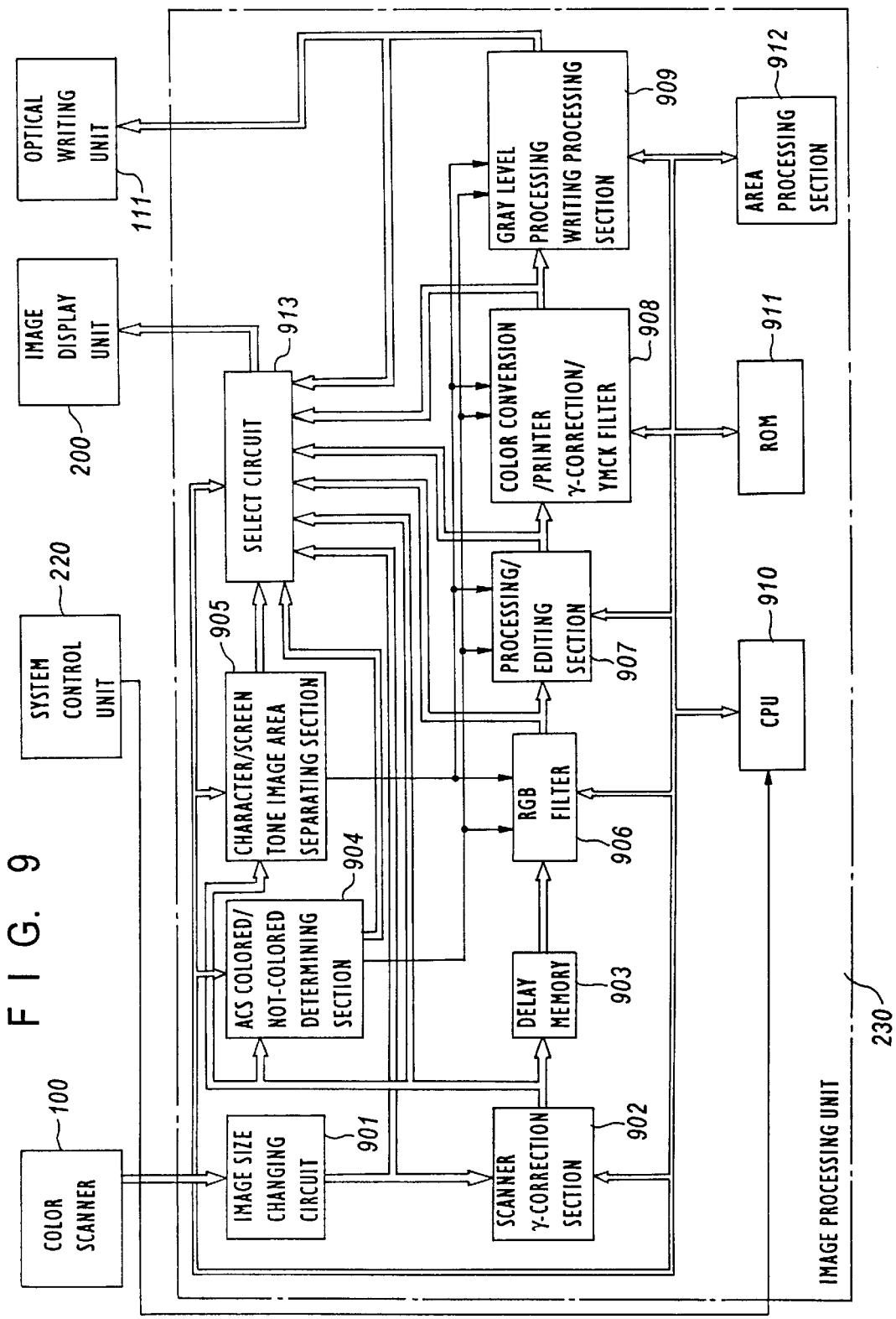
FIG. 9 is a block diagram showing detailed configuration of an image processing unit.

FIG. 9 is a block diagram showing detailed configuration of the image processing unit 230. In the figure, the reference numeral 100 indicates a color scanner for reading a document image with such a device as a CCD, while the reference numeral 111 indicates an optical writing unit for writing data having been subjected to image processing into a recording medium. Also the image processing unit 230 comprises the following processing function blocks.

Namely the image processing unit 230 comprises an image size changing circuit 901 for changing an image size in the main scanning direction, a scanner γ-correction section 902 for correcting a reflection factor linear data according to a look-up table, a delay memory 903, an ACS colored/not-colored determining section 904 for determining black and grey, a character/halftone image area separating section 905 for determining and separating a character section and a photograph section, an RGB filter 906 for switching filter coefficients for such operations as MTF correction, smoothing, edge processing, and through processing for RGB data and executing a processing according to the selected filter coefficient, a processing/editing section 907 for executing creative editorial works or color processing, a color conversion/printer γ-correction/YMCK filter 908 for executing YMCK conversion for RGB data, UCR and UCA processing, and setting a γ-coefficient for a printer and that for a filter according to a separated area, a grey level processing/writing processing 909 for executing dither processing, a CPU 910 for controlling the basic unit as a whole, a ROM 911 in which a control program is stored, an area processing section 912, and a select circuit 913 for selecting a signal from each of the function blocks described above and sending the signal to the image display unit 200.

Figure 13:
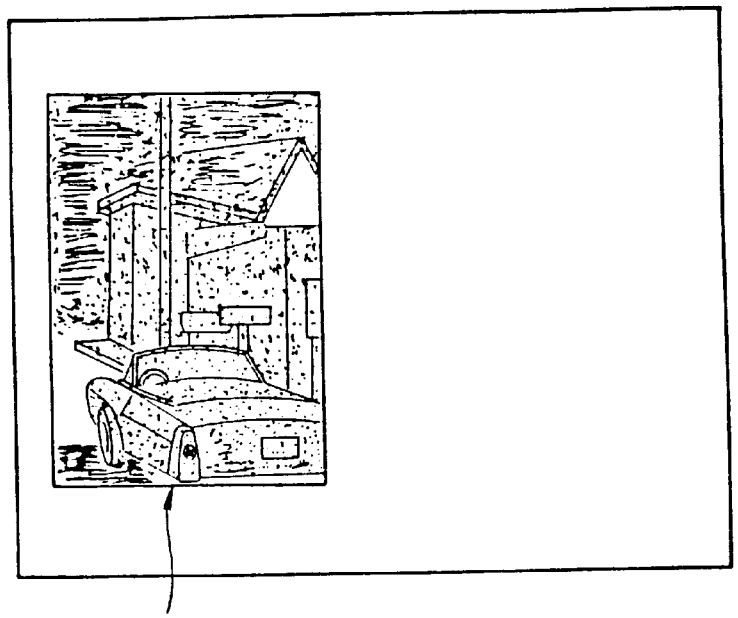
FIG. 13 is an explanatory view showing an example of a display screen provided when scanner γ-correction is to be confirmed.

Next, a description is made for the overall operations of the image forming apparatus having the configuration described above. The CPU 910 selects image data after subjected to a processing for changing an image size with the select circuit 913, and outputs said image data to the image display unit 200. The image display unit 200 transfers image data stored in the DRAM 207 by means of DMA transfer with the CPU 206 to the VRAM 201. With this operation, executed is transfer of image data to a corresponding area in the left side of the display 309 on the image display unit 200. As a result, as shown in FIG. 13, image data obtained in the first scan is displayed in the left side of the display 309. Then, when the second scan is started, the select circuit 913 is switched, image data having been subjected to scanner γ-correction is outputted to the image display unit 200, and similarly the image data is transferred from the DRAM 207 to a corresponding area in the right side of the display 309 on the VRAM 2001.

Figure 14:
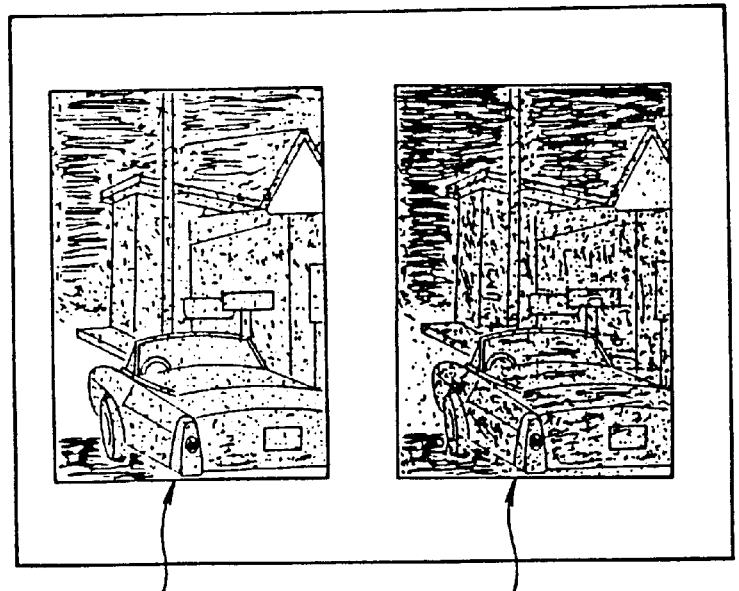
FIG. 14 is an explanatory view showing an example of a display screen provided when scanner γ-correction is to be confirmed.

With this operation, as shown in FIG. 14, image data obtained in the second scan is displayed in the right side of the display 309 of the image display unit 200 in alignment to the image data obtained in the first scan. The simultaneous (color) displays for R, G, and B and discrete display of each of data for R, G, and B are controlled in the image display unit 200 so that the displays are switched each time the plane switching key 305 shown in FIG. 3 is pressed down.

Thus, a user at first obtains a desired display image by selecting a γ-curve checking two types of image data outputted and displayed as described above, namely image data prior to processing and image data having been subjected to image processing and having a result of selection displayed on a screen. Then the user presses down the print start key 411 on the operating unit 240, when a copy image having been subjected to scanner γ-correction as specified is outputted.

For this reason, the user can recognize influence in the side of color scanner 100 and select a suited or preferred scanner γ-correction table. Also various types of light source for a film projector or a back light can be used and other types of scanner unit having a same level of input/output signals (yet comprising different types of light source, filter, CCD or the like) can be connected to the apparatus by changing the γ-correction.

Next, a description is made for operations of the image processing unit 230 described in FIG. 9. Image data outputted from the color scanner 100 is inputted to the image size changing circuit 901, and an operation for enlarging or compressing is executed to the image data obtained through by main scan. Then the reflection factor linear data is corrected according to the look-up system in the scanner γ-correction section 902. The image data having been subjected to this correction is inputted into the ACS colored/not-colored determining section 904 as well as into the character/halftone separating section 905. In the ACS colored/not-colored determining section 904, determination as to black and grey is executed.

Also the character/screen tone image area separating section 905 executes determination for an edge (by checking continuity of white pixels and black pixels), determination for an screen tone image (by checking a repetition pattern of wave crest/valley peak pixels in an image), and determination for a photograph (in a case where there is image data outside a character section and a halftone section), and determines areas of character and printed (screen tone) sections and a photograph section. And the determination data is used for switching parameters or coefficients in the RGB filter 906, processing/editing section 907, a color conversion/printer γ-correction/YMCK filter 908, and grey level processing/writing processing section 909.

Also the image data is delayed by the delay memory 903 taking into account delay of processing in the ACS colored/not-colored determining section 904 and character/halftone image area separating section 905 and is inputted into the RGB filter 906. The RGB filter 906 switches filter coefficients for MTF correction, smoothing, edge emphasis, and through for RGB image data according to a result of determination in the previous determining area.

The processing/editing section 907 executes creative editorial works and color processing operations. In the creative editorial works, such a processing as inclination, mirroring, shadowing, and inside-blanking is executed. In the color processing, such a processing as color conversion for converting a color of a document to a different color, deletion of a specified color, and under color for adding a back ground color.

In the color conversion/printer γ-correction/YMCK filter 908, printer γ-correction and a filter coefficient are set according to a result of determination in the previous determining section. In the grey level processing/writing processing section 909, such a processing as dither processing, setting of timing for writing, setting of an image area or an area for inside-blanking, or generation of a test pattern such as grey scale or color patch is executed, and final image data is outputted to the optical writing unit 111.

Each of the functional sections described above is connected to the CPU 910, and setting of conditions for each processing and the operations are executed by a program stored in the ROM 111 according to an instruction from the system control unit 220. Herein output from each processing block is inputted into a downstream circuit, but the output is also inputted into the select circuit 913, and input from which processing block should be outputted to the image display unit 200 is controlled by the CPU 910. As for input from each image processing block to the select circuit 913, in addition to RGB image data, LSYNC, FGATE (frame gate), and CLOCK signals each of which are line synthesizing signals are inputted for synchronization to the image display unit 200.

Figures 10, 11:
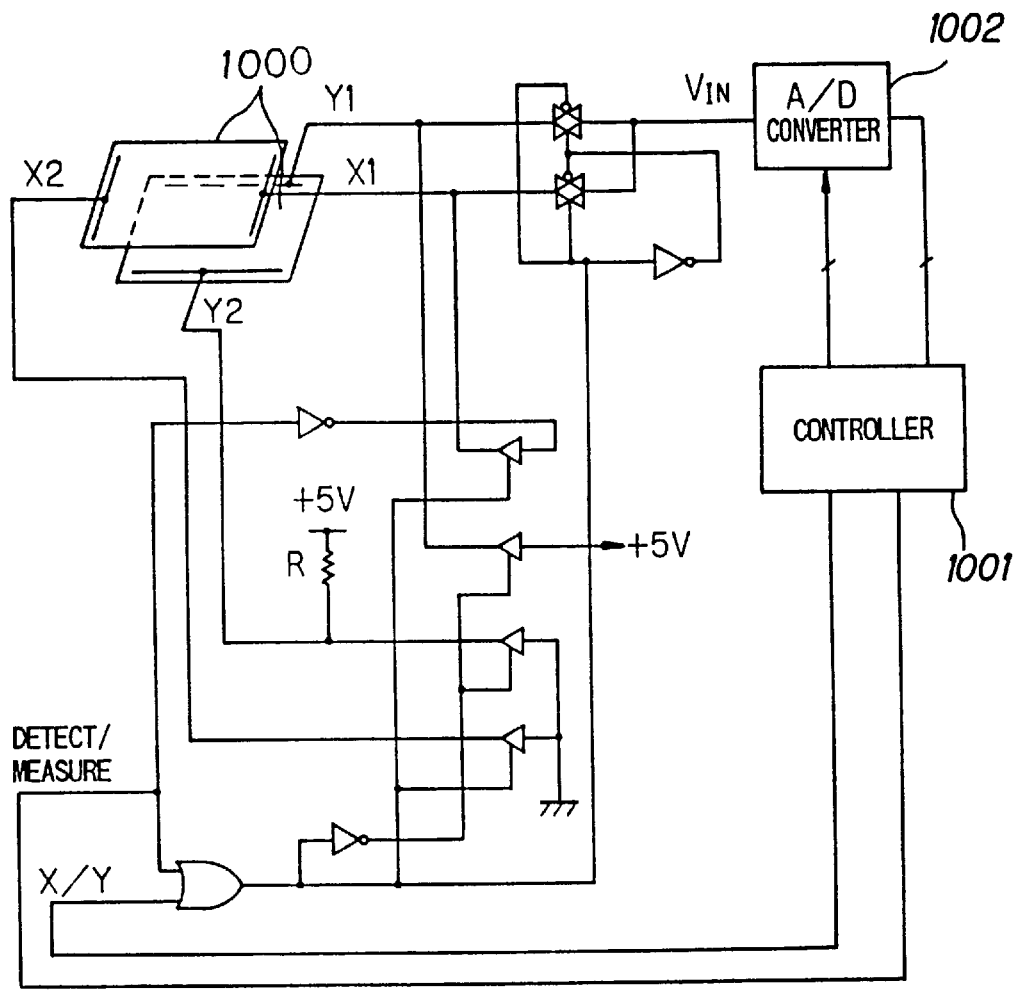
FIG. 10 is an explanatory view showing configuration of a touch panel detecting circuit in the operating unit according to the present embodiment.
FIG. 11 is a view showing combination of an input signal and an output signal in the touch panel detecting circuit in FIG. 10.

FIG. 10 is an explanatory view showing configuration of a touch panel detecting circuit on the operating unit 240 according to the present embodiment. In this figure, designated at the reference numeral 1000 a touch panel with the touch panel key 402 provided thereon, at 1001 a controller for controlling the circuit as a whole, and at 1002 an A/D converter for converting an analog signal to a digital signal.

The touch panel detecting circuit described above is set with the controller 1001 by setting a detection terminal into high state and combining X1, X2, Y1, and Y2 according to the chart shown in FIG. 11, and the circuits Y1, Y2 are pulled up with a resistor. When the touch panel 1000 is OFF, Y1 is set to +5 V, and when the touch panel 1000 is ON, Y1 is set to 0 V. For this reason, ON/OFF state of the touch panel can be confirmed by checking output from the A/D converter 1002. The controller 1001 switches the operating mode to the measurement mode when ON state of the touch panel 1000 is detected. In a case of X direction, X1 is set to +5 V and X2 to 0 V with potential at an input position connected through Y1 to the A/D converter 1002, thus coordinate being computed. Also coordinate in the Y direction is computed similarly by switching the circuit, and a depressed position on the touch panel 1000 is detected by the detecting circuit as described above.

Figure 12:
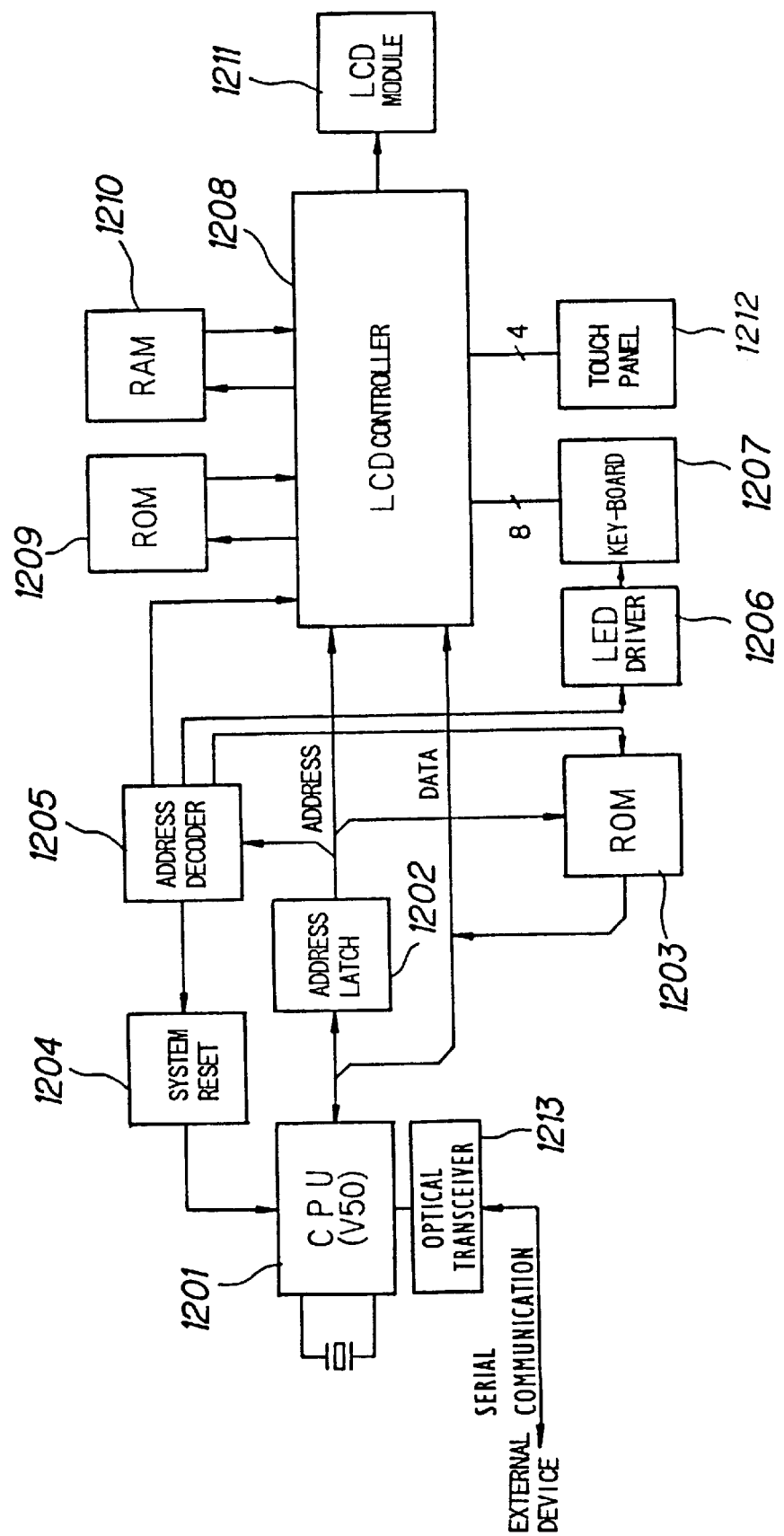
FIG. 12 is an explanatory view showing configuration of the operation unit according to the present embodiment.

FIG. 12 is a block diagram showing configuration of the operating unit 240 according to the present embodiment. In this figure, designated at the reference numeral 1201 is a CPU controlling this operating unit 240 as a whole, at 1202 an address latch, at 1203 a ROM, at 1204 a system reset connected to the CPU 1201, at 1205 an address decoder, at 1206 a LED driver, at 1207 a key-board, and at 1208 a LCD controller. Connected to the LCD controller 1208 are, in addition to an address bus and data bus from the CPU 1202, the LED driver 1206, key-board 1207, an LCD (liquid crystal) module 1211, an analog touch panel key 1212, and a ROM 1209 and RAM 1210 or the like for display data. Also connected to the CPU 1201 is an optical transceiver 1213 for executing serial communication with external devices.

In the configuration described above, an address signal from the CPU 1201 is fetched into the address latch 1202 and is controlled according to a signal from the CPU 1201. A portion of an address signal from the address latch 1202 is inputted into the address decoder 1205, where a chip select to each IC is made and is used for preparation of a memory map. The address signal goes into a memory such as ROM or RAM, and the LCD controller 1208, and is used for address specification.

On the other hand, the data bus from the CPU 1201 is connected to a memory or the LCD controller 1208, and bilateral communication of data is executed. The LCD controller 1208 prepares display data from data stored in the ROM 1209 and RAM 1210 according to a signal from the key-board 1207 or a signal from the touch panel key of the touch panel 1000, and controls display on the LCD model 1211.

Figure 15:
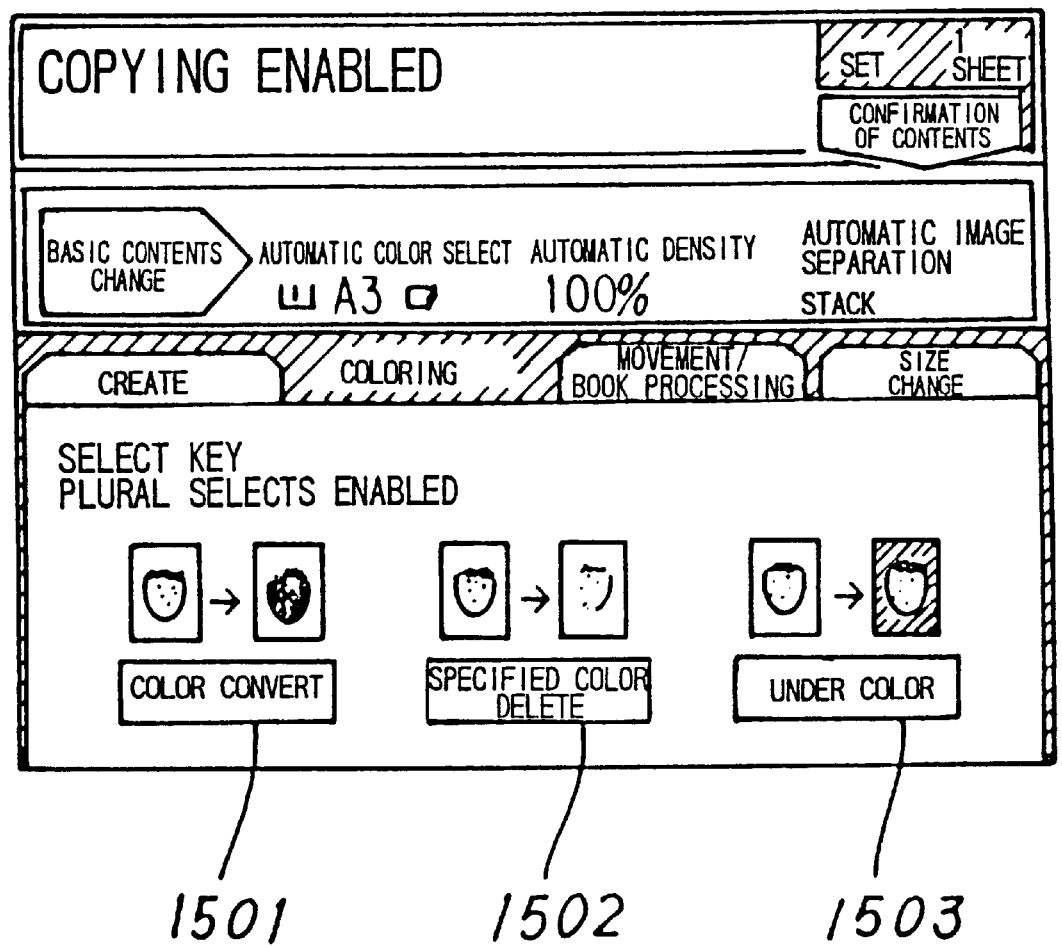
FIG. 15 is an explanatory view showing an example of a touch panel display provided when a color processing key is pressed down.

Next, a description is made for color processing. FIG. 15 is an explanatory view showing an example of display on the touch panel in a case where the color processing key is pressed down. In this case, the processing/editing key is selected on the image processing confirming mode setting screen (Refer to FIG. 7) in the image processing state confirming mode is selected, and then the create key or color processing key is selected.

In FIG. 15, the color processing state, parameters for which are specified with the color conversion key 1501, specified color delete key 1502, and under color key 1503, and also a screen showing a state prior to processing and that after processing are simultaneously displayed on the display 309 of the image display unit 200. For this display, workability of a user is improved. Also a state of a copy image can be checked on the display 309 of the image display unit 200 before outputted, so that possibility of incorrect copy is reduced.

Figure 16:
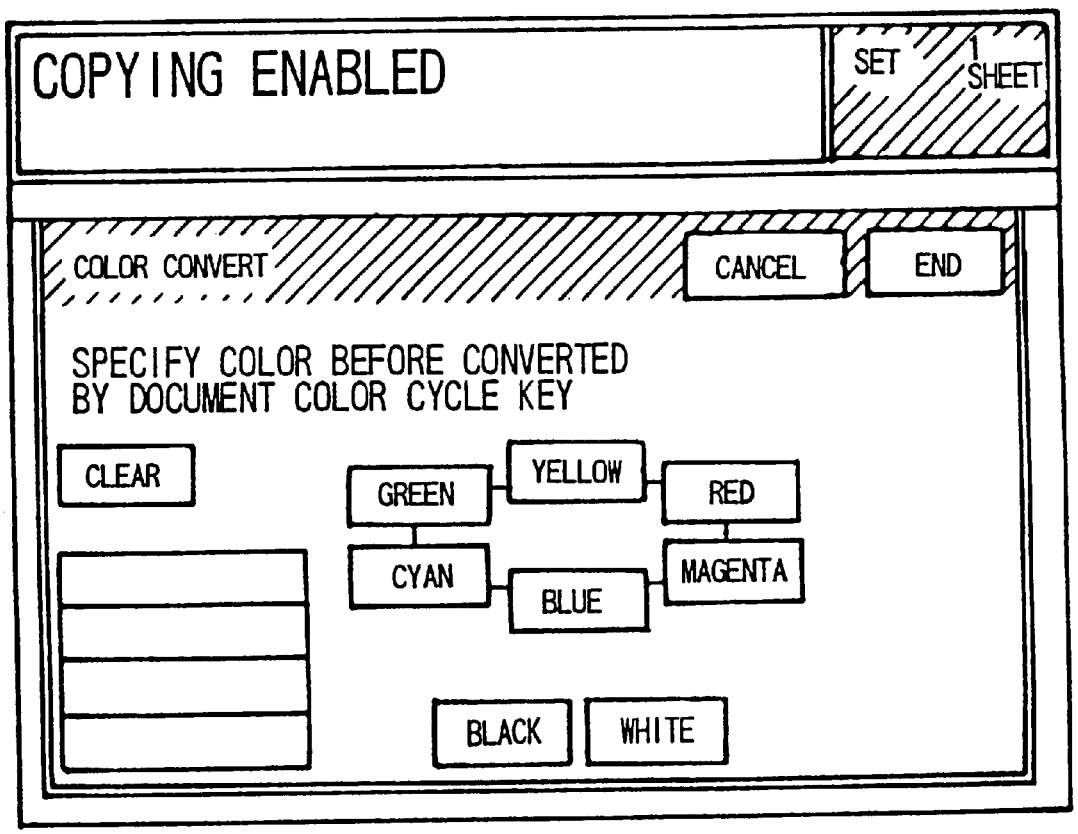
FIG. 16 is an explanatory view showing an example of a touch panel display before conversion provided when a color converting key is pressed down.
Figure 17:
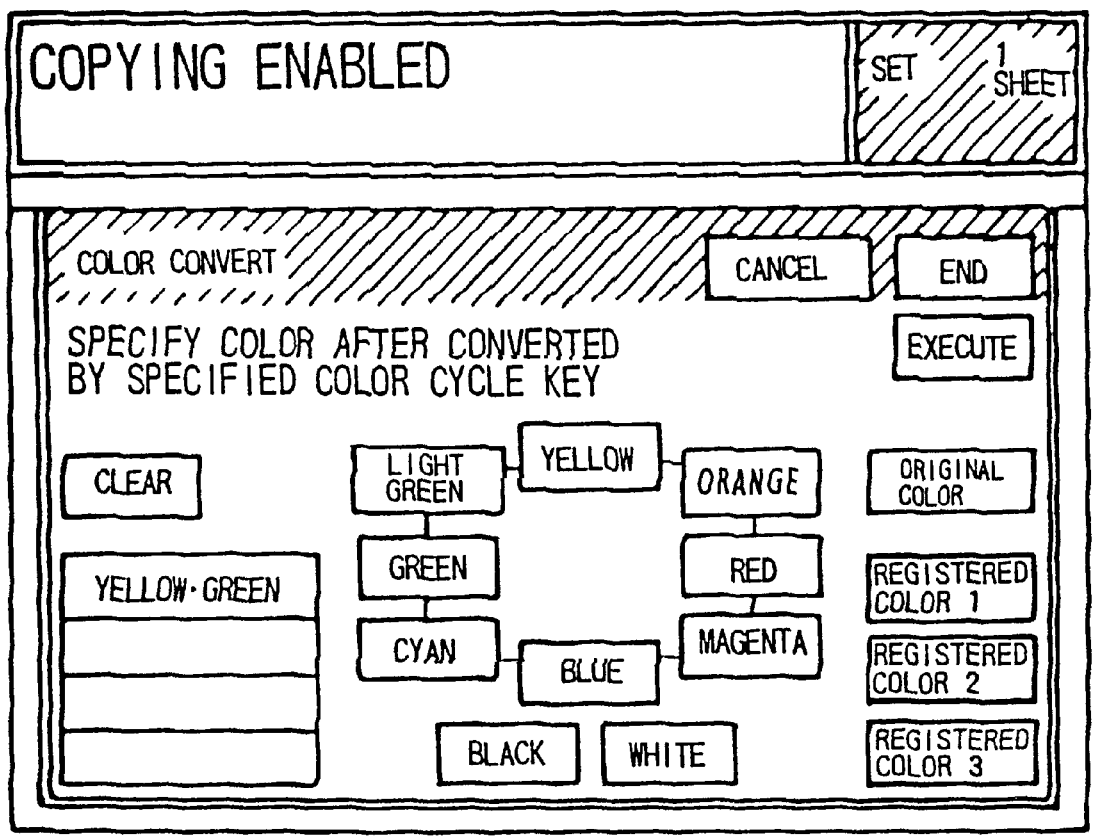
FIG. 17 is an explanatory view showing an example of a touch panel display after conversion provided when a color converting key is pressed down.

Then description is made for the color processing with reference to a case of color conversion as an example. When the color conversion key 1501 is pressed down on the display screen shown in FIG. 15, the screen shown in FIG. 16 is displayed and colors before conversion are set. When the colors are set, the screen shown in FIG. 17 is displayed. Then colors after conversion are set, and "Execute" key is pressed down, when the image processing state confirming mode is started. When the image processing state confirming mode is started, image read is started, and the image data is inputted into the image processing unit 230.

Figure 18:
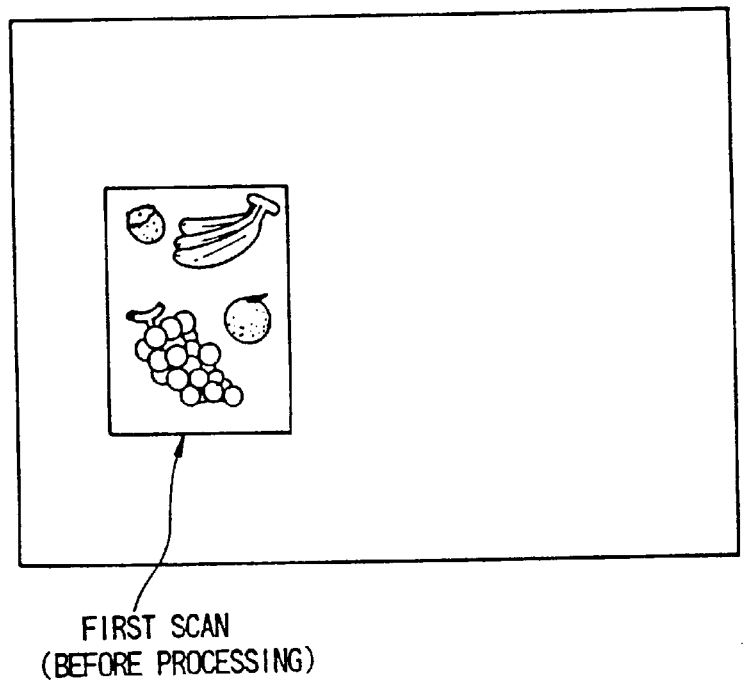
FIG. 18 is an explanatory view showing an example of a display screen provided when color conversion is to be executed.
Figure 19:
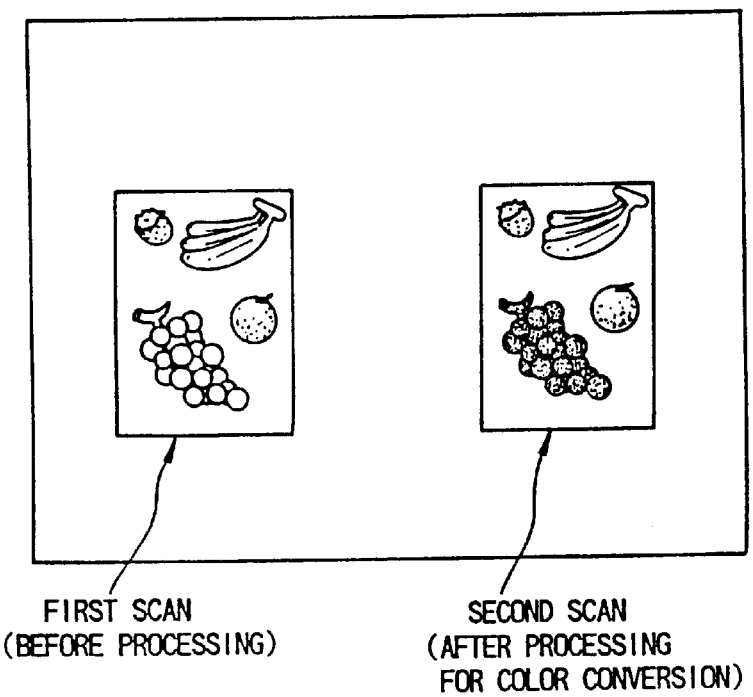
FIG. 19 is an explanatory view showing an example of a display screen provided when color conversion is to be executed.

In FIG. 9, the CPU 910 selects image data having been subjected to processing by the RGB filter 906 with the select circuit 913, and outputs the image data to the image display unit 200. The image display unit 200 displays, like in the case of confirmation of scanner γ-correction, the image data obtained in the first scan as shown in FIG. 18 in the left side of the display 309 thereon. Then, when the second scan is started, the select circuit 913 is switched, and image data after processing/editing is outputted on the image display unit 200. The image display unit 200 displays the image data obtained in the second scan together with the image data obtained in the first scan in the right side of the display 309 as shown in FIG. 19.

Figure 20:
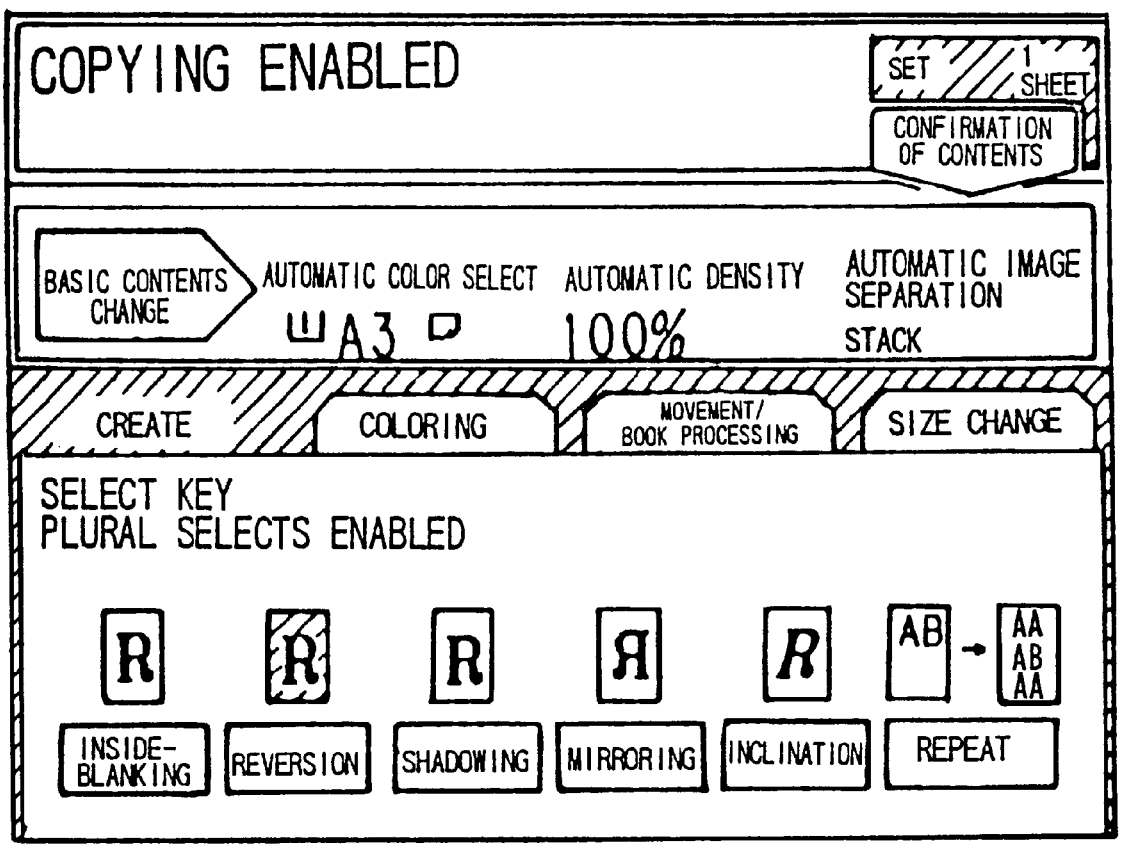
FIG. 20 is an explanatory view showing an example of a touch panel display provided when creative edition is to be executed.
Figure 21:
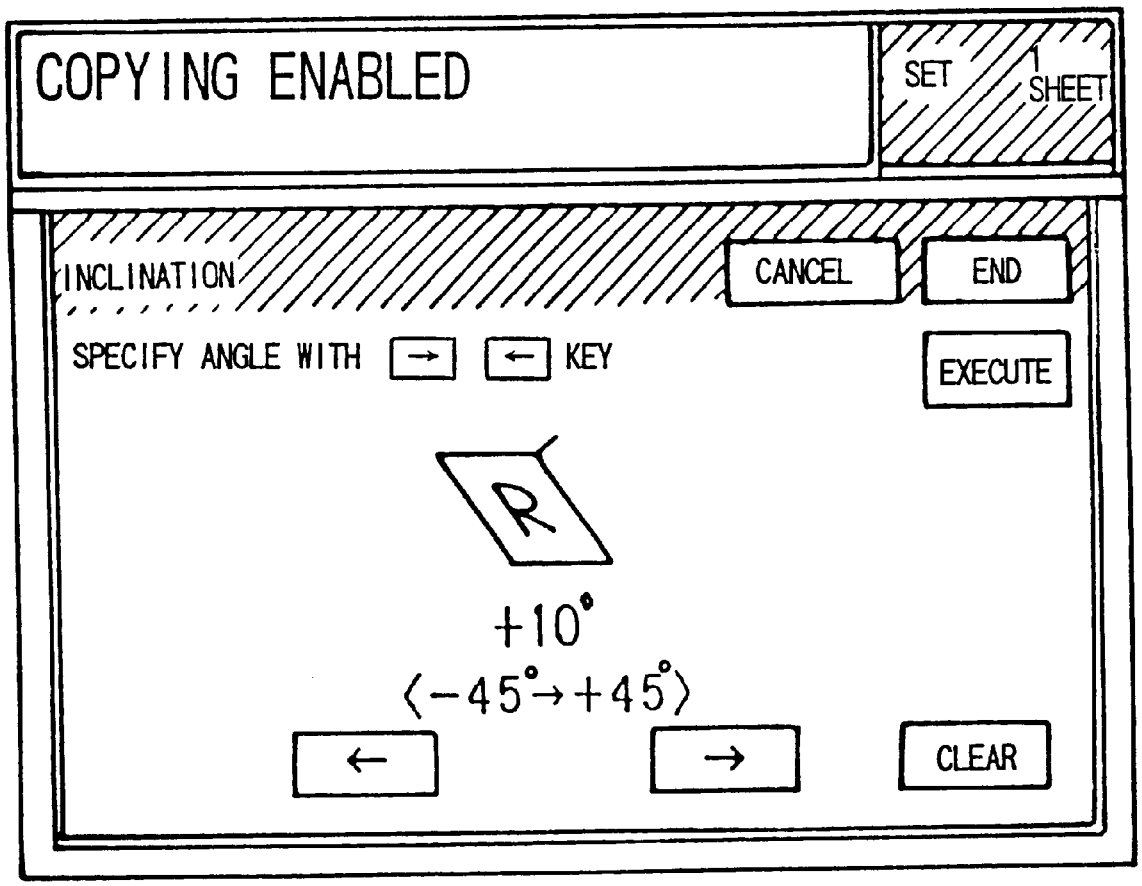
FIG. 21 is an explanatory view showing an example of a touch panel display provided when inclination is to be executed.
Figure 22:
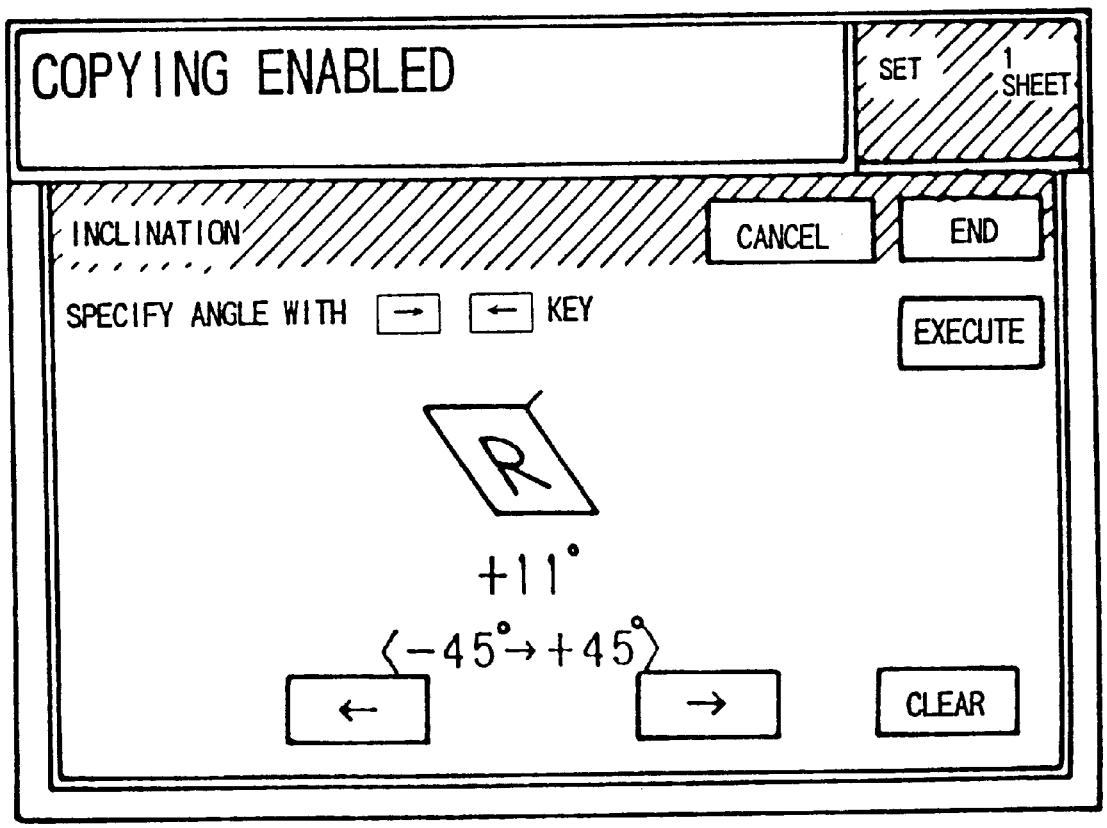
FIG. 22 is an explanatory view showing an example of a touch panel display provided when inclination processing is to be executed.
Figure 23:
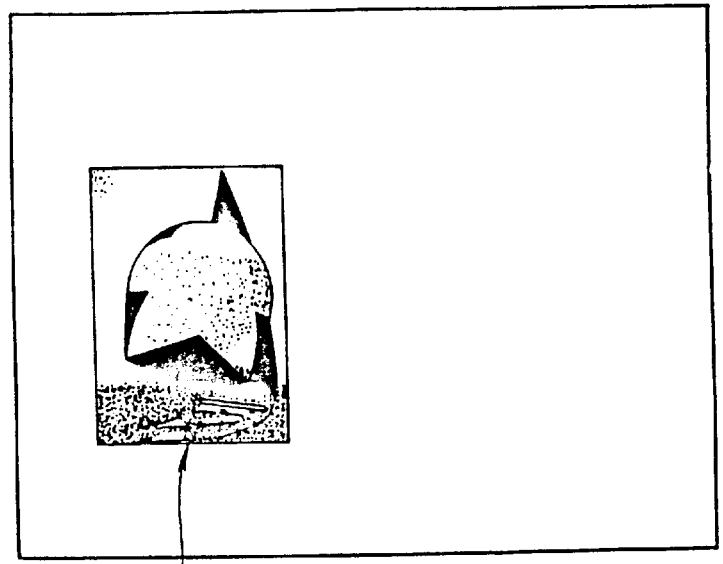
FIG. 23 is an explanatory view showing an example of a display screen provided when inclination processing is executed.
Figure 24:
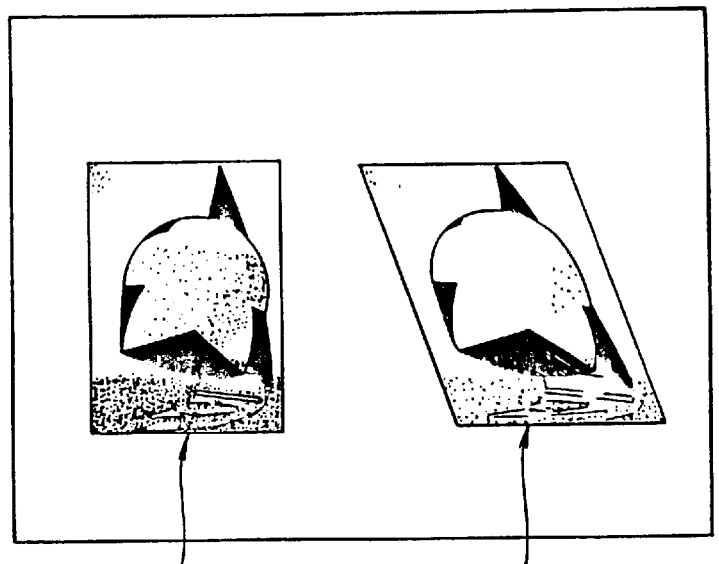
FIG. 24 is an explanatory view showing an example of a display screen provided when inclination is executed.

Then description is made for a case when, as an example of creative editorial works, processing for inclination is executed. When the inclination key is pressed down in FIG. 20, the screen shown in FIG. 21 is displayed. An angle for inclination is set with the arrow key on the screen shown in FIG. 21, and the "Execute" key is pressed down, when the image processing state confirming mode is started. When the operating mode is started, the color scanner 100 is started with an operation for reading an image also started, and the image data is inputted into the image processing unit 230. Then, like in a case of color conversion, for instance, the screen shown in FIG. 23 or FIG. 24 is displayed. And, if a user can not set an desired angle for inclination checking on the screen after the processing shown in the right side of FIG. 24 is finished, the user again sets an angle with the arrow key and pressed down the "Execute" key, when display is provided again, and after the user confirms the displayed angle for inclination, a copy image is outputted.

Figure 25:
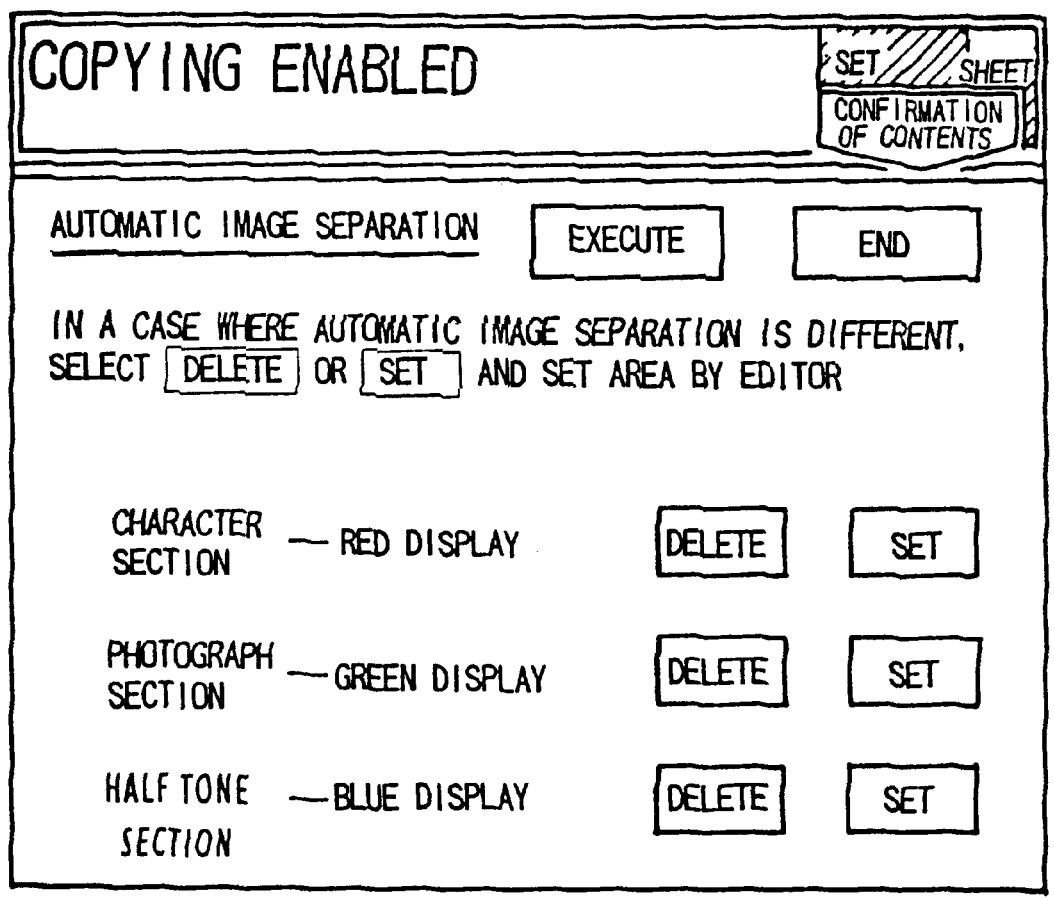
FIG. 25 is an explanatory view showing an example of a display screen in a case where, on an image processing confirming mode setting screen in a confirming mode for a state of image processing, an automatic image separating key is pressed down.
Figure 26:
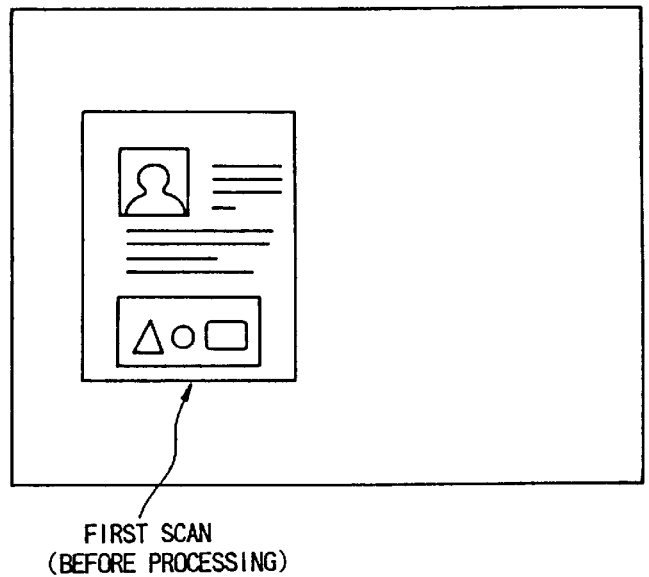
FIG. 26 is an explanatory view showing an example of a display screen provided when automatic image separation is to be executed.

Then description is made for the automatic image separation processing. FIG. 25 is an explanatory view showing an example of screen display in a case when the automatic image separation processing is selected on the image processing confirming mode setting screen (Refer to FIG. 7) in the image processing state confirming mode. In this figure, for confirming the automatic image separation state, a user presses down the "Execute" key, when this processing is started. With this start, the color scanner 100 is enabled, and an operation for reading an image is started, and image data is inputted into the image processing unit 230.

Then in FIG. 9, the CPU 910 selects image data having been subjected to processing by the RGB filter 906 with the select circuit 913, and outputs the image data to the image display unit 200. The image display unit 200 displays, like in a case of confirmation of scanner γ-correction, image data obtained in the first scan in the left side of the display 309 thereon. Then, when the second scan is started, the select circuit 913 is switched, and image data having been subjected to processing/editing is outputted onto the image display unit 200. The image display unit 200 displays the image data obtained in the second scan together with the image data obtained in the first scan in the right side of the display 309.

Figure 27:
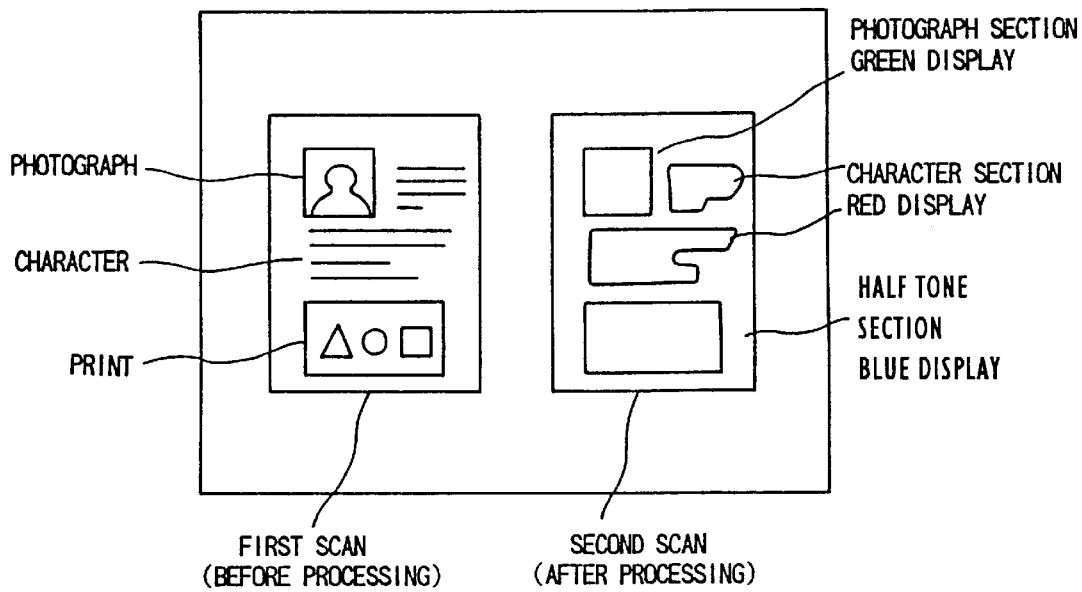
FIG. 27 is an explanatory view showing an example of a display screen provided when automatic image separation is to be executed.

The character/screen tone image separating section 905 shown in FIG. 9 outputs a character section, a photograph section, and a screen tone section as R data, G data, and B data respectively to the select circuit 913. As a result, as shown in FIG. 27, the character section area is displayed with red display, photograph section area with green display, and screen tone area with blue display, so that the user can visually recognize the separated images.

By the way, in a case of an ordinary document, the function for automatic image separation works normally, but the edge detection system or pattern detection system, which is well known to people skilled in the art, is used as a system for image separation, so that sometimes determination can not be executed correctly in some types of document. For this reason, as shown in FIG. 25, when incorrect determination is made, the user presses down the "Delete" key and "Set" key on the display screen of the operating unit 240. The user can execute correction by selecting an area on the display 309 at the image display unit 200. The area data specified herein is sent as coordinate data from the image display unit 200 via the system control unit 220 to the image processing unit 230. Then the CPU 910 makes the character/screen tone image separating section 905 correct the area incorrectly determined.

In this state as shown in FIG. 25, when the "Execute" key is pressed down, the operation is immediately executed, and the display is provided again. If correct determination is executed, the user pressed down the print start key 411, when a copy image is outputted. For this reason, coefficients or parameters for the RGB filter 906, processing/editing section 907, color conversion/printer γ-correction/YMCK filter 908, and gray level processing/writing section 909 of the image processing unit 230 are changed or corrected according to a result of image separation described above, so that the image quality can be improved.

Also by outputting a result of image separation on a monitor screen, it becomes possible for a user to specify an area even when a result of image separation is not correct, so that the possibility of miss copy can be reduced also in a case of document which can hardly be separated automatically.

Figure 28:
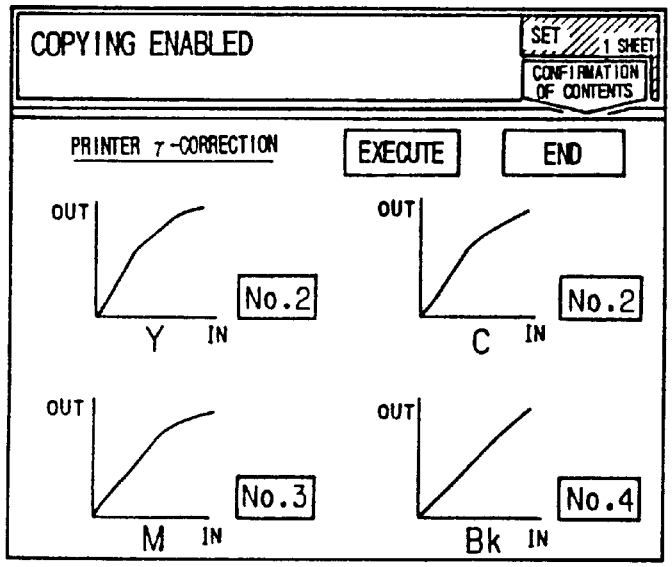
FIG. 28 is an explanatory view showing an example of a display screen provided when, on an image processing confirmation display setting screen in a confirming mode for a state of image processing, a printer γ-processing key is pressed down.

Then description is made for an example of printer γ-correction. FIG. 28 is an explanatory view showing an example of a screen when a user pressed down the printer γ-processing key on the image processing confirming display setting screen (Refer to FIG. 7) in the image processing state confirming mode. In this figure, γ-curves for Y, M, C, and K are displayed, so that a user can select a γ-curve according to a type of document or to the user's will. Selection of a γ-curve can be executed by pressing down the γ-curve select key to execute white/black reversion, then inputting a number of a required γ-curve by ten-key 401, and pressing the # key.

To execute display for printer γ-correction checking, a user presses down the "Execute" key, when the operation is started. It should be noted that, as the display 309 of the image display unit 200 is a device for RGB input and can not display image data for YMCK discretely, the display 309 is divided to 4 portions, and each portion is displayed with a color corresponding to and of Y, M, C, and K respectively, so that confirmation and adjustment of printer γ-correction can be executed.

Then in FIG. 9, the CPU 910 selects image data for the color conversion/printer γ-correction/YMCK filter 908 with the select circuit 913. In the select circuit 913, an output from the color conversion/printer γ-correction/YMCK film 908 is connected to 1 line of RGB for RGB input, and the image data is outputted to the image display unit 200. The image display unit 200 transfers image data stored in the DRAM 207 to the VRAM 201 with the CPU 206 by way of DMA transfer. With this operation, transfer of image area to a corresponding area in the left top section of the display 309 is executed.

Figure 29:
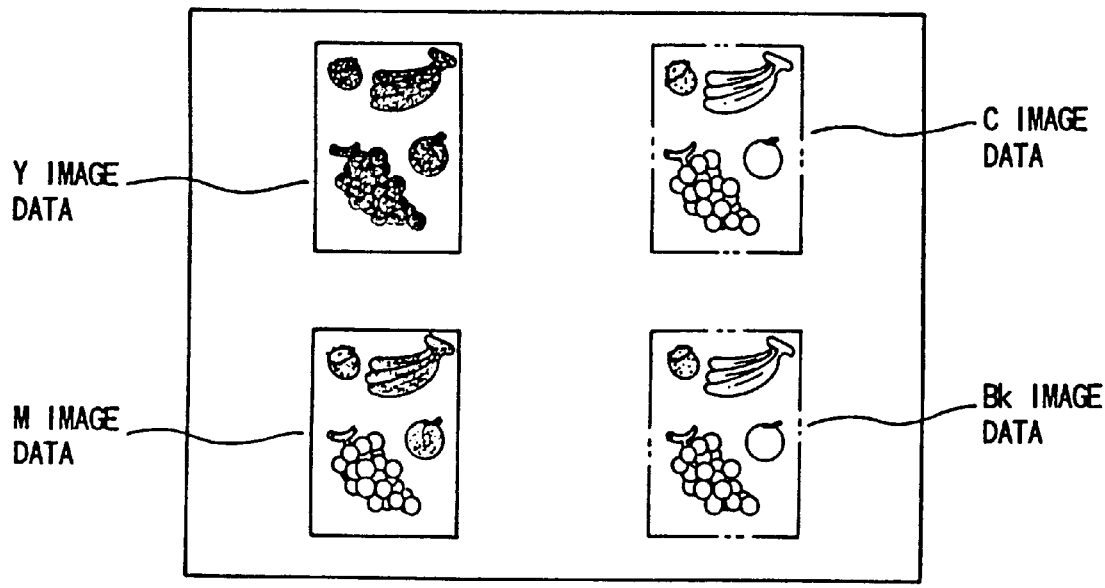
FIG. 29 is an explanatory view showing an example of a display screen provided when printer γ-correction is to be executed.

As a result, as shown in FIG. 29, the Y image data obtained in the first scan is displayed in the left top section of the display 309 as shown in FIG. 29. Then M image data obtained in the second scan is displayed in the left bottom section, C image data obtained in the third scan in the right top section of the display 309, and Bk image obtained in the fourth scan in the right bottom section of the display 309. Namely, the Y, M, C, and Bk images are displayed on a screen in the display 309.

A user selects a γ-curve checking the 4 types of image data, and when a desired image is obtained, the user presses down the print start key 411, when a copy processed according to the specified printer γ-correction is outputted. For this reason, a user can recognize a state of image quality and set conditions or parameters for printer γ-correction to obtain an image with a desired quality without outputting a trial copy. Also even in a case where recording paper has rough surface or colored one, a desired image faithful to the document can be obtained by changing the parameters.

In the mode setting screen in the image processing state confirming mode shown in FIG. 7, the processing/editing key 704 is pressed down to set up the processing/editing mode, and then the image synthesizing key 3001 is selected (Refer to FIG. 30). This operation is executed to display a confined synthetic image on the image display unit 200 (display editor) 200 in a superimposed state by executing inside deletion and outside deletion between different documents.

When the image synthesizing key 3001 is pressed down, a display having the contents as shown in FIG. 30 is provided. Then an inside-deleted document is set in the first document and the Execute key 3002 is pressed down, when an operation for reading contents of the document is started, and the entire document is displayed on the image display unit (display editor) 200. When an area for inside deletion is specified after the display is provided (Refer to FIG. 31) and the Execute key 3002 is pressed down, a screen showing a state prior to processing but reflecting contents of the processing for inside deletion and a screen showing a state after processing this time are displayed side by side on the image display unit (display editor) 200 simultaneously.

Then an outside-deleted document is set in a second document and the Execute key 3003 is pressed down, when the document image is displayed on the previous inside-deletion processing screen in a superimposed state, and thus the user can grasp a state of image synthesis by confining images.

Because the processing as described above has been realized with the present invention, efficiency of a work executed by a user can be improved, and also before a hard copy image is outputted, the contents can be checked, so that the possibility of generation of miss copying can be reduced.

Figure 31:
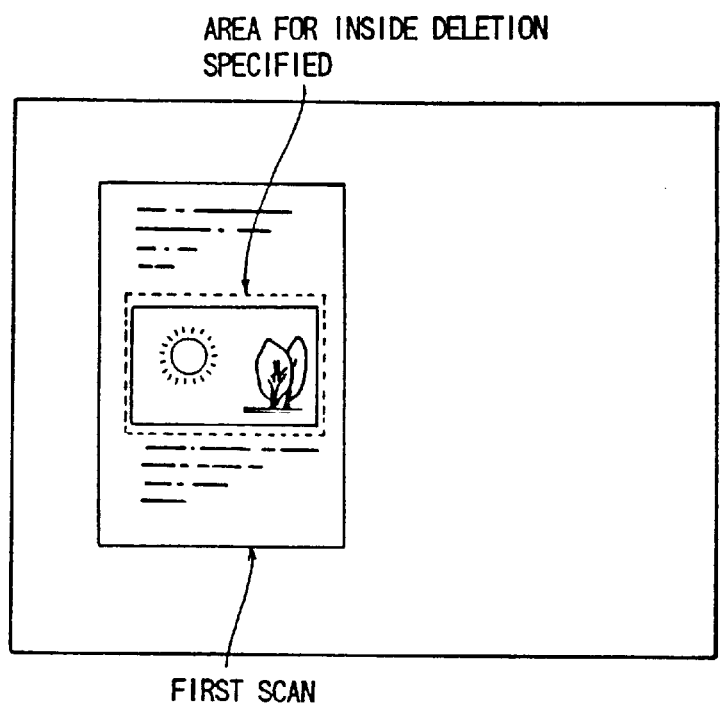
FIG. 31 is an explanatory view showing an example of a display screen provided when an inside deleting area is specified.

Now, a description is made for concrete operations. In FIG. 19, the CPU 910 selects image data outputted from the RGB filter 906 with the select circuit 913, and outputs the image data to the image display unit 200, and like in a case of scanner γ-correction confirming, the image data obtained in the first scan is displayed in the left side of the image display unit (display editor) 200 as shown in FIG. 31.

Figure 32:
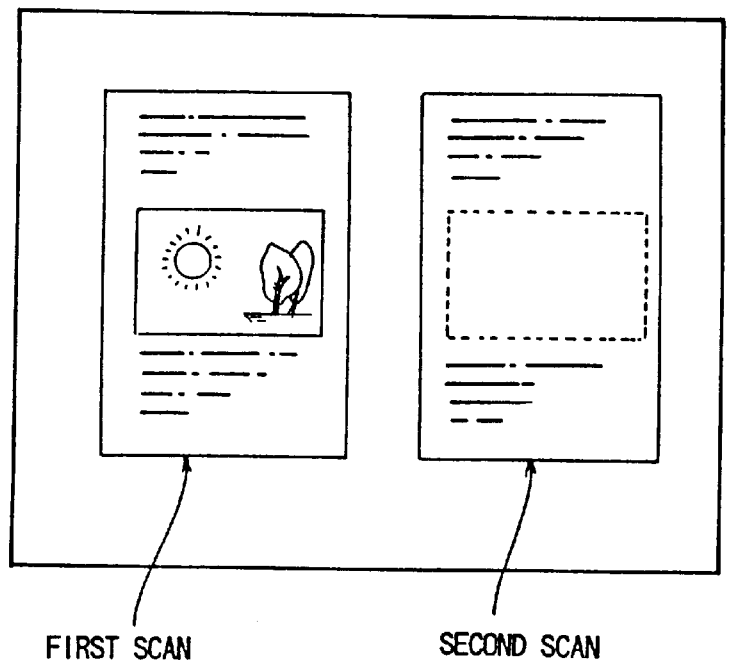
FIG. 32 is an explanatory view showing an example of a display screen provided when images obtained in a first scan and in a second scan are displayed in a row.

Then, when the second scan is started, the select circuit 913 is switched with image data subjected to processing/editing outputted onto the image display unit 200, and image data obtained in the second scan is displayed together with the image data obtained in the first scan side by side in the right side of the image display unit (display editor) 200 as shown in FIG. 32.

Figure 33:
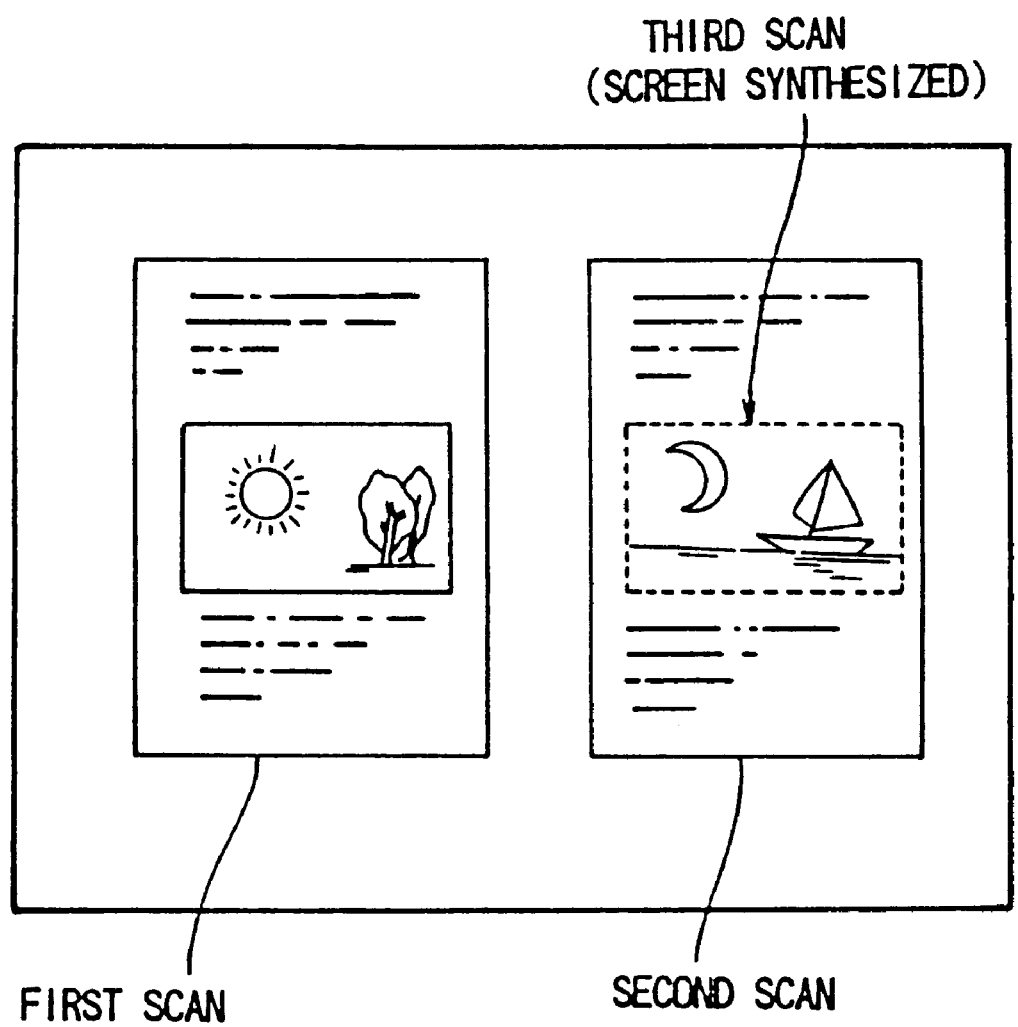
FIG. 33 is an explanatory view showing an example of a display screen provided when an image obtained in a third scan is synthesized to the image in the second scan.

Furthermore, in the third scan, as shown in FIG. 33, a document is exchanged with a new one and the Execute key is pressed down, when image data having been subjected to processing/editing is synthesized through the select circuit 913 with the image data obtained in the second scan and the synthesized image is displayed.

Then, in a processing for synthesizing an image on the image forming apparatus, a synthesized image is formed on the transfer belt, the image is transferred onto recording paper, and image processing for two images displayed in the right side of the image display unit (display editor) 200 can be executed successively.

Next, a description is made for another embodiment in which displays of an image prior to and after processing are provided simultaneously. In this embodiment, a result of processing is not displayed by using image processing blocks of the image forming apparatus, and after a read image is received by the display section, a specified processing is executed on a screen of the unit (operating section and display section) by software stored in the CPU therein, and a result of the processing is displayed as it is with the instruction issued to the image processing section, thus a desired image being outputted.

Figure 34:
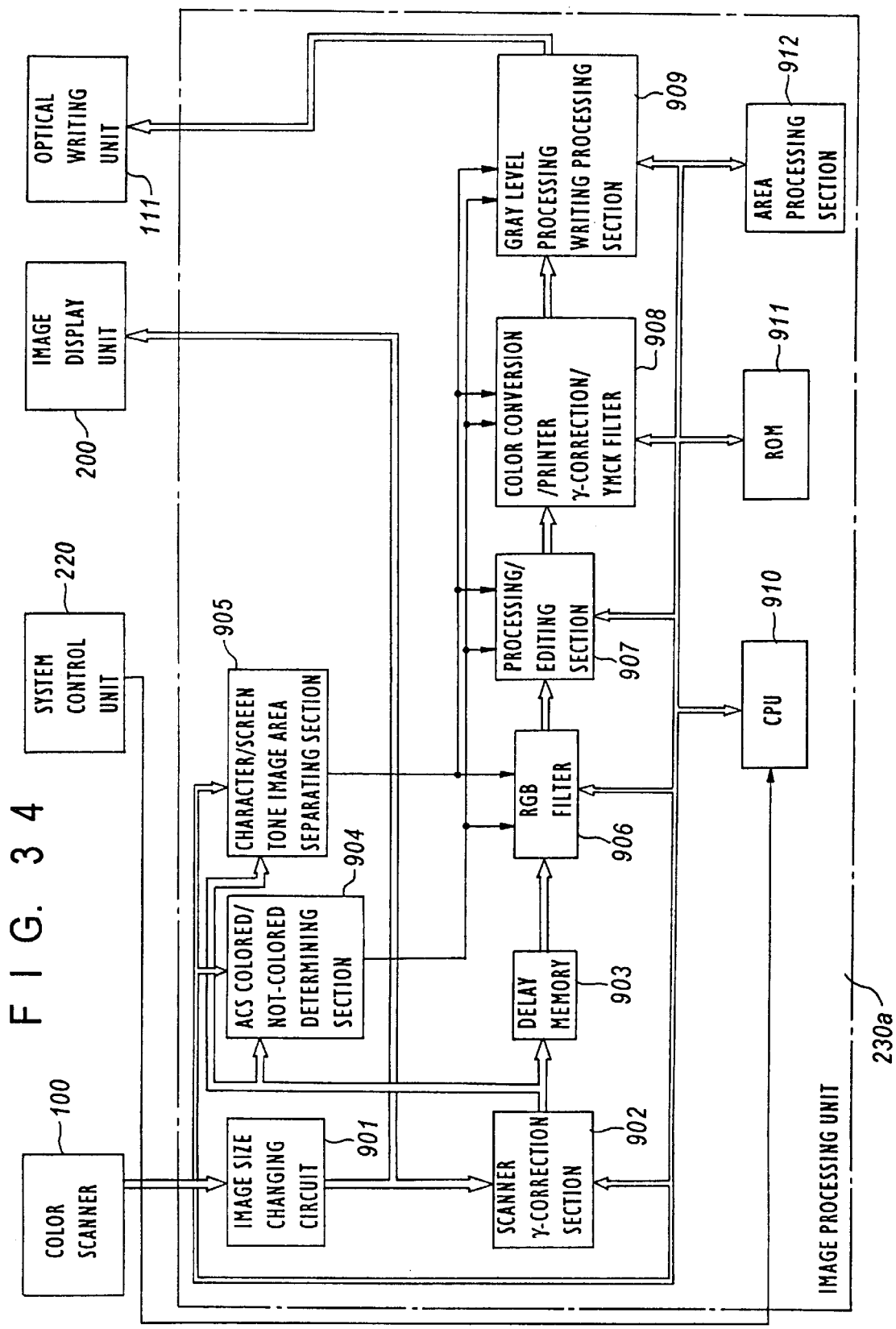
FIG. 34 is a block diagram showing detailed configuration of an image processing unit according to other embodiment.

FIG. 34 is a block diagram showing an image processing unit 230a according to this embodiment, and in this embodiment, the select circuit 913 in the image processing unit 230 shown in FIG. 9 is eliminated, and as a result signal input to the select circuit 913 in each of a plurality of processes for image processing is also eliminated, and a signal after a processing for image size change by the image size changing circuit 901 is directly inputted to the image display unit 200 in the image processing unit 230a. As a result, there is only one section of an image display unit in the image processing unit 230a, so that the hardware configuration is more simple as compared to that in the embodiment described above.

As described above, in the image forming apparatus according to the present invention, the system controlling means executes control processing according to parameters for processing or a setting mode each inputted from an operating means, the image processing means subjects the image data to a specified image processing according to a control signal from the system controlling means, and then switchably displays the image data after the processing and image data prior to processing on a monitor in the image display means, so that a user can directly confirm images prior to processing and after the processing when selecting parameters for image processing, and furthermore can operate adjustment to the image quality checking the display screen, which makes it possible to directly display thereon and make adjustment to the image data prior to processing and after the processing when a user selects parameters for image processing and to accurately and quickly realize fine adjustments to image processing.

In the image forming apparatus according to the present invention, each block for hardware image processing therein which is specifically designed thereto has a function of being a switching section to the display means through a selecting circuit, whereby high-speed image processing and display processing can be executed, and further image processing blocks required for image forming can be used in common in performing edit/working display, and for this reason hardware and software for only displaying can be reduced.

Namely, in a sequence of editorial working for an image by using an ordinary scanner for a general purpose and printing out, read image data is fetched to memory (virtual reality is included) in a personal computer through a specific or general-purpose (SCSI) interface, is displayed on a CRT of the personal computer, is processed with application soft, and if an image is required to transfer again from the memory to a printer, and assuming that full-color image data is composed by 8 bits each for RGB, 400 dpi, and A3 size thereof, the image data becomes 92.8 M bytes obtained by the following expression: $(297 \div 25.4 \times 400) \times (420 \div 25.4 \times 400) \times 3 = 92.8$ M bytes. It takes a long time only to transfer this image data, further much more time is required for processing with application soft with the present invention, however, such problems as described above can be resolved.

In the image forming apparatus according to the present invention, in a case where a number of gray levels and resolution in the image display section are smaller or lower as compare to those in the image processing section in the basic body of image forming apparatus, common image processing blocks are not used for display processing in the image data display section and image processing in the image forming apparatus, so that a work load to functions for hardware in the basic body of image forming apparatus can be reduced, and a result of processing can be displayed according to software processing in the operating section as well as in the display section, and for this reason, any effects is not given especially to hardware for the image processing section in the basic body of image forming apparatus.

In the image forming apparatus according to the present invention, the image processing means displays image data prior to processing (read data for documents) and image data after the processing by the image processing means on a same monitor screen in the image display means, so that a user can directly confirm images both prior to processing and after the processing when selecting parameters for image processing, and further can execute adjustment to the image quality checking the display screen, which makes it possible to directly display thereon and make adjustment to image data prior to processing and after the processing when a user selects parameters for image processing and to accurately and quickly realize fine adjustments to image processing.

In the image forming apparatus according to the present invention, the image processing means displays scanner γ-characteristics prior to correction and after the correction for each of R, G, and B of read image data on the image display means, and at the same time displays select keys for selecting parameters for γ-correction for each of R, G, and B data to the read image data, and executes processing of density correction for image data according to the γ-characteristics corresponding to the select key, so that the γ-characteristics of the readout image can accurately be grasped, and adjustments corresponding thereto can accurately be executed.

In the image forming apparatus according to the present invention, the image processing means displays printer γ-characteristics for Y, M, C, and Bk on the image display means, and at the same time displays select keys for selecting parameters for γ-correction for each of R, G, and B data corresponding to the image data to be finally outputted, and executes processing of density correction for image data according to γ-characteristics corresponding to the select key, so that the γ-characteristics for the image output device can accurately be grasped, and adjustments corresponding thereto can accurately be executed.

In the image forming apparatus according to the present invention, the image processing means displays select keys for selecting each of processing or editorial works such as inclination, shadowing, mirroring, inside-blanking, and coloring on the image display means, and executes processing or editorial works for image data according to depression of any of the select keys, which makes it possible to directly display thereon and make adjustment to image data prior to processing and after the processing when a user selects parameters for image processing and to accurately and quickly realize fine adjustments to image processing.

In the image forming apparatus according to the present invention, the image processing means separates a character section, a halftone section, and a photograph section from each other for each area on the image display means, which makes it possible to confirm a result of the separation thereof at once, and the image processing means further displays select keys for setting and deleting for each discrete area, and executes image processing of the discrete image according to depression of the select key, so that identification of each area in processing for separating an image and setting operations of the processing can be executed without fail.

In the image forming apparatus according to the present invention, a user presses a select key checking the discrete image outputted and displayed on the image display means, and executes modification to an area indicated with the select key in the image processing means, so that identification of each area in processing for separating an image and setting operations of the processing can be executed without fail.

In the image forming apparatus according to the present invention, color conversion or image processing or editorial works is executed with hardware by executing reading operations (scanning operations) according to a number of times when data is displayed on the display to put the image data into each of image processing blocks, which makes it possible to realize high-speed processing thereof. Especially when a state of processing for color conversion (conversion from RGB to YMCK) is to be displayed, one color in the range from RGB data to YMCK data is converted once in each scan, which is effective. Also, scan is executed for each color, so that an image having a vast memory capacity otherwise required is not necessary, which makes it possible to achieve cost reduction of the apparatus.

In the image forming apparatus according to the present invention, image data prior to and after processing can simultaneously be displayed on the image display section by one scan prior to processing and after the processing of processing blocks in the RGB system, which makes it possible to achieve reduction of time required for the processing.

In the image forming apparatus according to the invention, how an image is synthesized can be checked prior to formation of a synthesized image, so that the possibility of generation of miss copying can be reduced. Also, precision of an image formed for superimposing different images on each other can be improved.

In the image forming apparatus according to the present invention, image data can be checked before forming the image, which makes it possible to achieve reduction of the possibility of miss copying, and at the same time to synthesize any portion of an image only by one scan, and for this reason reduction of time required for the processing and improvement of the productivity thereof can be achieved. In addition, determination as to how images are superimposed on each other, namely precision of images can also be improved.

In the image forming apparatus according to the present invention, a user presses down the scanner γ-correction key when density correction for read image data is executed, or presses down the printer γ-correction key when density correction for outputted image data is executed, or presses down the automatic image separating key in a case where a character section, a photograph section, and a halftone section for the read image data are to be automatically and discretely processed, or presses down the processing/editing key when processing and editorial works such as creative edition or coloring, and the system controlling means executes a control processing according to selection of a key in the operating means, and gives the control signal to the image processing means, then the image processing means executes a specified image processing corresponding to the key input to the image data according to the control signal, and switches the image data after the processing and image data prior to processing, or simultaneously displays the image data onto the image display means, so that a user can directly confirm images prior to processing and after the processing when selecting parameter for image processing, and further can execute operations for adjustment to the image quality checking the display screen, which makes it possible for a user to directly display thereon and make adjustment to image data prior to processing and after the processing when the user selects parameters for image processing and to accurately and quickly realize fine adjustments to the image processing.

In the image forming apparatus according to the present invention, a user selects any of the prepared keys such as the processing/editing key, or create/editing key for executing a processing such as inclination, mirroring, shadowing, and inside-blanking, or the color processing key for executing a processing such as color conversion, deletion of a specified color, and under color, whereby a user can accurately and quickly make fine adjustments to the image quality checking the image displayed on the image display means according to the specified processing mode corresponding to the select key.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image forming apparatus for optically reading a document image, executing specified processing to digitized image data of said image, and forming the image on a recording medium, comprising:

operating means for displaying a mode setting key screen for obtaining a desired image and inputting a processing mode according to a key selection on said mode setting key screen;

system controlling means for executing control processing according to the inputted processing mode;

image processing means for executing specified image processing to said image data according to a control signal from said system controlling means; and image display means for switchable displaying image data, corresponding to the same document image, outputted from said image processing means prior to and after processing, respectively;

wherein said image processing means identifies and said operating means displays discretely a character section, a halftone section, and a photograph section, and displays a select key corresponding to each discrete area onto said operating means.

2. An image forming apparatus according to claim 1, wherein said image processing means executes correction for the area according to an instruction by the select key outputted and displayed on said image display means.

3. An image forming apparatus for optically reading a document image, executing specified processing to digitized image data of said image, and forming the image on a recording medium, comprising:

operating means for displaying a mode setting key screen for obtaining a desired image and inputting a processing mode according to a key selection on said mode setting key screen;

system controlling means for executing control processing according to the inputted processing mode;

image processing means for executing specified image processing to said image data according to a control signal from said system controlling means, wherein the image processing means includes a plurality of image processing blocks;

a select circuit for fetching data inputted to and outputted from each of the plurality of image processing blocks and outputting image data; and image display means for simultaneously displaying image data, corresponding to the same document image, outputted from said select circuit prior to and after processing respectively.

4. An image forming apparatus according to claim 3, wherein said image processing means switchably displays image data, corresponding to the same document image, prior to and after processing, respectively, on the same image display means.

5. An image forming apparatus according to claim 3, wherein said operating means displays a select key for selecting parameters for scanner γ-correction (γ-correction for each of R, G, and B data) and said image processing means executes image processing form said image data when the select key is selected.

6. An image forming apparatus according to claim 3, wherein said operating means displays a select key for selecting parameters for printer γ-correction (γ-correction for each of M, C, Bk data) and said image processing means executes image processing for said image data according to selection of said select key.

7. An image forming apparatus according to claim 3, wherein said operating means displays a select key for selecting processing or editorial works including inclination, shadowing, mirroring, inside-blanking, and coloring and said image processing means executes image processing for said image data according to selection of said select key.

8. An image forming apparatus according to claim 3, wherein image data is displayed in a row on the same image display means once for a plurality of reading operations.

9. An image forming apparatus according to claim 3, wherein image data prior to and after processing is displayed on the same image display means once for each reading operation.

10. An image forming apparatus according to claim 3, wherein an image is synthesized and displayed on said image display means once for a plurality of reading operations.

11. An image forming apparatus according to claim 3, wherein any portion of a document image is synthesized and displayed on said image displaying means according to a reading operation.

12. An image forming apparatus according to claim 3, wherein the image processing means comprises a plurality of serially connected image processing units.

13. An image forming apparatus for optically reading a document image, executing specified processing to digitized image data of said image, and forming the image on a recording medium, comprising:

operating means for displaying a mode setting key screen for obtaining a desired image and inputting a processing mode by selecting a key on said mode setting key screen;

system controlling means for executing control processing according to the inputted processing mode;

image processing means for executing specified image processing to said image data according to a control signal from said system controlling means; and image display means for switchable displaying image data, corresponding to the same document image, outputted from said image processing means prior to and after processing, respectively;

wherein said image processing means has a plurality of image processing blocks and displays image data prior to and after processing from each image processing block onto said image display means;

wherein said image processing means identifies and said operating means displays a character section, a half tone section, and a photograph section discretely, and displays a select key corresponding to each discrete area onto said operating means.

14. An image forming apparatus according to claim 13, wherein said image processing means executes correction for the area according to an instruction by the select key outputted and displayed on said image display means.

15. An image forming apparatus for optically reading a document image, executing specified processing to digitized image data of said image, and forming the image on a recording medium, comprising:

operating means for displaying a mode setting key screen for obtaining a desired image and inputting a processing mode by selecting a key on said mode selecting key screen;

system controlling means for executing a control processing according to the inputted processing mode;

image processing means for executing specified image processing to said image data according to a control signal from said system controlling means; and image display means for simultaneously displaying image data, corresponding to the same document image, outputted from said image processing means prior to and after processing, respectively;

wherein said image display means comprises processing means for providing control over operations for image data on a display screen, a storage section and a converting section;

the converting section for converting image data to display data and storing the display data in the storage section for output to the display screen, and the image display means for processing the stored display data according to an instruction from the processing means for output to the display screen and for storing the instruction in the storing section for output to the system controlling means, wherein the system controlling means provides control of image processing by the image processing means according to the transmitted instruction.

16. An image forming apparatus according to claim 15, wherein said image processing means displays image data, corresponding to the same document image, prior to and after processing, respectively, on the same image display means.

17. An image forming apparatus according to claim 15, wherein said operating means displays a select key for selecting parameters for scanner γ-correction (γ-correction for each of R, G, and B data) and said image processing means executes image processing for said image data when the select key is selected.

18. An image forming apparatus according to claim 15, wherein said operating means displays a select key for selecting parameters for printer γ-correction (γ-correction for each of M, C, Bk data) and said image processing means executes image processing for said image data when the select key is selected.

19. An image forming apparatus according to claim 15, wherein said operating means displays a select key for selecting processing or editorial works including inclination, shadowing, mirroring, inside-blanking, and coloring and said image processing means executes image processing for said image data when the select key is selected.

20. An image forming apparatus according to claim 15, wherein image data prior to and after processing is displayed on the same image displayed means once for each reading operation.

21. An image forming apparatus for optically reading a document image, executing specified processing to digitized image data of said image, and forming the image on a recording medium comprising:

operating means for displaying a mode setting key screen for obtaining a desired image and inputting a processing mode by selecting a key on said mode selecting key screen;

system controlling means for executing a control processing according to the inputted processing mode;

image processing means for executing specified image processing to said image data according to a control signal from said system controlling means; and image display means for switchable displaying image data, corresponding to the same document image, outputted from said image processing means prior to and after processing, respectively;

wherein said image display means has display section processing means for providing control over operations for image data on a display screen, sends an instruction from said display section processing means via said system controlling means to said image processing means, and said image processing means executes image processing according to said instruction; and wherein said image processing means identifies and displays discretely each of a character section, a halftone section, and a photograph section, and displays a select key corresponding to each discrete area onto said operating means.

22. An image forming apparatus according to claim 21, wherein said image processing means executes correction for the area according to an instruction by the select key outputted and displayed on said image display means.

23. An image forming apparatus for optically reading a document image, executing specified processing to the digitized image data of said image, and forming the image on a recording medium, comprising:

operating means comprising a scanner γ-correction key for selecting density correction for read image data, a printer γ-correction key for selecting density correction for outputted image data, an automatic image separating key for automatically and discretely processing a character section, a photograph section, a halftone section of read image data, and a processing/editing key for selecting processing and editorial works;

system controlling means for executing control processing according to a key input from said operating means;

image processing means for executing specified image processing corresponding to said key input of said image data according to a control signal from said system controlling means; and image display means for simultaneously displaying image data, corresponding to the same document image, outputted from said image processing means prior to and after processing, respectively.

24. An image forming apparatus according to claim 23, wherein said operating means comprises a create/edit key for executing processing including inclination, mirroring, shadowing, and inside-blanking when the processing/editing key is pressed down, and a color processing key for executing processing including color conversion, deletion of a specified color, and under color when the processing/edit key is pressed down.

* * * * *